(12) United States Patent
Lang et al.

(10) Patent No.: US 12,497,424 B2
(45) Date of Patent: Dec. 16, 2025

(54) CHIRAL MULTIDENTATE LIGAND, AND APPLICATION THEREOF IN ASYMMETRIC HYDROGENATION

(71) Applicant: SHENZHEN CATALYS TECHNOLOGY CO., LTD, Shenzhen (CN)

(72) Inventors: Qiwei Lang, Shenzhen (CN); Xiaobing Ding, Shenzhen (CN); Yang Xiao, Shenzhen (CN)

(73) Assignee: SHENZHEN CATALYS TECHNOLOGY CO., LTD, Guangdong (CN)

( * ) Notice: Subject to any disclaimer, the term of this patent is extended or adjusted under 35 U.S.C. 154(b) by 513 days.

(21) Appl. No.: 17/983,563

(22) Filed: Nov. 9, 2022

(65) Prior Publication Data

US 2023/0124576 A1   Apr. 20, 2023

Related U.S. Application Data

(63) Continuation of application No. PCT/CN2021/141933, filed on Dec. 28, 2021.

(30) Foreign Application Priority Data

Nov. 3, 2021   (CN) .......................... 202111295798.3

(51) Int. Cl.
| | |
|---|---|
| *C07F 17/02* | (2006.01) |
| *B01J 31/22* | (2006.01) |
| *C07C 29/145* | (2006.01) |
| *C07C 37/00* | (2006.01) |
| *C07C 41/18* | (2006.01) |
| *C07C 237/08* | (2006.01) |
| *C07D 213/30* | (2006.01) |
| *C07D 333/16* | (2006.01) |

(52) U.S. Cl.
CPC ............ *C07F 17/02* (2013.01); *B01J 31/2295* (2013.01); *C07C 29/145* (2013.01); *C07C 37/002* (2013.01); *C07C 41/18* (2013.01); *C07C 237/08* (2013.01); *C07D 213/30* (2013.01); *C07D 333/16* (2013.01)

(58) Field of Classification Search
CPC ..................................................... C07F 17/02
See application file for complete search history.

(56) References Cited

PUBLICATIONS

Bartlett "Exploiting Chemical Diversity for Drug Discovery" Edited by Paul A Bartlett and Michael Entzeroth, the Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "Zinc—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS RegistrySM) Sep. 2016 2 pages.*
Ohkuma, Journal of the American Chemical Society (2000), 122(27), 6510-6511.*

\* cited by examiner

*Primary Examiner* — Nizal S Chandrakumar
(74) *Attorney, Agent, or Firm* — Ming Jiang; OPENPTO US LLC

(57) ABSTRACT

Disclosed are a chiral multidentate ligand (I), a preparation, and an application thereof. In this method, compound (M1) is subjected to condensation with compound (M2) followed by amine deprotection in the presence of a deprotection reagent to obtain compound (M4). Compound (1) is subjected to deprotonation by butyl lithium and phosphorization followed by dimethylamino group substitution to produce compound (3). The compound (3) and the compound (M4) are reacted in the presence of triethylamine to produce chiral multidentate ligands.

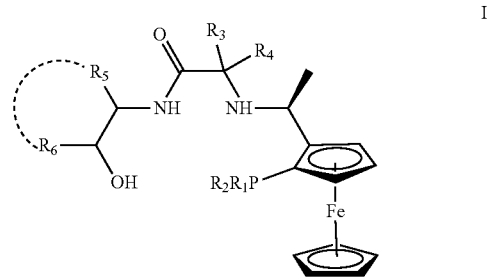

3 Claims, 6 Drawing Sheets

CHIRAL MULTIDENTATE LIGAND, AND APPLICATION THEREOF IN ASYMMETRIC HYDROGENATION

CROSS-REFERENCE TO RELATED APPLICATIONS

This application is a continuation of International Patent Application No. PCT/CN2021/141933, filed on Dec. 28, 2021, which claims the benefit of priority from Chinese Patent Application No. 202111295798.3, filed on Nov. 3, 2021. The content of the aforementioned application, including any intervening amendments thereto, is incorporated herein by reference in its entirety.

TECHNICAL FIELD

This application relates to fine chemistry, and more specifically to a chiral multidentate ligand, and an application thereof in asymmetric hydrogenation.

BACKGROUND

Chiral molecules are abundant in nature, existing in amino acids, proteins, and sugars required for human life. The culprit behind the "Contergan scandal" in the West in the early 1960s, which led to about 12,000 babies born with defects worldwide, commonly known as "seal babies", was thalidomide. Thalidomide is composed of two twin chemicals, that is a right-handed compound and a left-handed compound. The right-handed compound (R-configuration) has a gestation-inhibiting activity, while the left-handed compound (S-configuration) is teratogenic. With the development of science and technology and the raising living standards, chiral compounds are more widely used in pesticides, pharmaceuticals, foods, materials, and fine chemicals. Consequently, it is of great significance for scientists to study chirality and explore more efficient and concise methods to synthesize optically pure chiral molecules.

Asymmetric catalytic reactions are the most economical and efficient methods for the synthesis of chiral compounds, through which a large number of chiral products can be obtained by applying catalytic amounts of chiral catalysts. In particular, metal-catalyzed asymmetric hydrogenation reactions have received great attention as their unique high atomic economy, high enantioselectivity, and environmental friendliness, and have been developed tremendously over decades. The first homogeneous-catalyzed hydrogenation reaction is reported by Prof. Wilkinson in 1965 (*Chem. Commun.* 1965, 17), while the first asymmetric homogeneous-catalyzed hydrogenation reaction is reported by Prof. Knowles in 1968 (*Chem. Commun.* 1968, 1445). Afterward, more and more asymmetric hydrogenation reactions are used for commercial production, such as the synthesis of L-dopamine by Monsanto, L-menthol by Takasago, and (S)-isopropylmethoate by Novartis. Especially, BASF successfully achieves the synthesis of 10,000 tons of L-menthol by using asymmetric hydrogenation reactions in 2012.

In asymmetric hydrogenation reactions, chiral ligands show an important influence on the activity and stereoselectivity of the reaction. Hence, researchers have designed ligands with suitable electrical and spatial site resistance to achieve fine tuning of the reaction. Since the discovery of the Noyori ruthenium-bisphosphine-bisamine system and the deep study of the mechanism of metal-ligand synergistic-catalyzed bifunctionalization, ligands containing N—H groups have been widely studied and used in the asymmetric catalytic hydrogenation of ketones. As early as 1998, Prof. Zhang has designed and synthesized a class of tridentate ligands (ph-ambox) containing a bisoxazoline ring and N—H functional groups for the asymmetric catalytic hydrogenation of aromatic ketones (*J. Am. Chem. Soc.* 1998, 120, 3817). Subsequently, his group designs and synthesizes an indan-ambox having a greater site resistance for the asymmetric hydrogenation of simple ketones (*Chem. Commun.* 2010, 46, 3979). In 2011, Prof. Zhou introduces pyridine group into the bidentate Spiro-AP ligand to obtain the tridentate Spiro-PAP ligand, and the iridium complex of this ligand is more stable in catalytic hydrogenation and can efficiently and selectively reduce simple aryl ketones with an enantiomeric excess (ee) value of 96%-99.9% and an extremely high turnover number (TON) of 4,550,000 (*Angew. Chem. Int. Ed.* 2011, 50, 7329).

The ruthenium-bisphosphine bisamine system and several representative tridentate ligands for catalytic asymmetric hydrogenation are as follows:

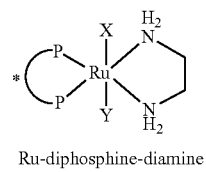

Ru-diphosphine-diamine

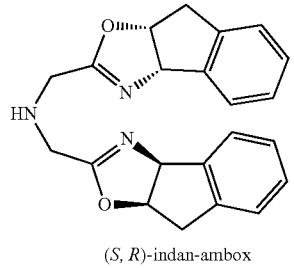

(S, R)-indan-ambox

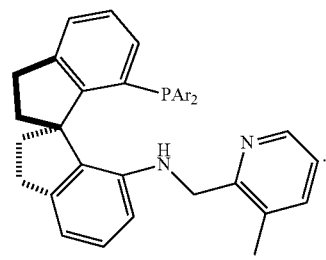

SpiroPAP

Zhang discloses a new class of ferrocene-based chiral tridentate PNN ligands (f-amphox) based on Ambox ligands, which exhibits superb activity and stereoselectivity in the asymmetric hydrogenation of aromatic ketones (*Org. Lett.* 2016, 18, 2938). Subsequently, a series of novel ferrocene-based chiral ligands are developed, all of which exhibits excellent activity and stereoselectivity in the asymmetric hydrogenation of aromatic ketones, greatly enriching the ligand library, shown as follows:

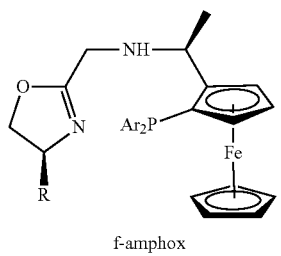

f-amphox

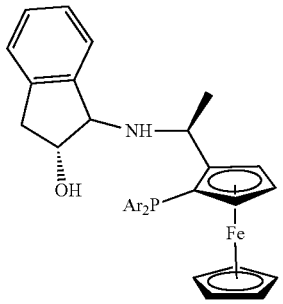

f-amphol

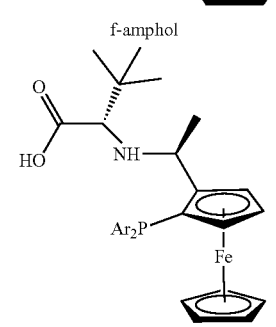

f-ampha

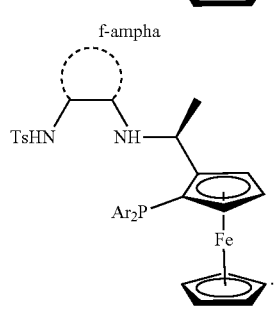

f-amphamide

Due to the diversity of substrates, it is still important to develop different ligands to satisfy the needs of different substrates. Compared with existing catalytic systems and tridentate ligands, the present disclosure proposes a new multi-dentate chiral ligand, which is low-cost, simple in synthesis, easy for large-scale preparation, and adjustable in structure and electrical properties. The multi-dentate chiral ligand provided herein exhibits ultra-high activity and stereoselectivity in asymmetric hydrogenation reactions and has broad industrial application prospects

SUMMARY

An object of this application is to provide a chiral multidentate ligand, a preparation, and an application thereof in asymmetric hydrogenation. The chiral multidentate ligand provided herein is simple to synthesize, available in raw materials, and stable in air atmosphere, high in catalytic activity and stereoselectivity, and easy to realize industrial production.

Technical solutions of this application are described below.

A first object of this application is to provide a chiral multidentate ligand of formula (I)

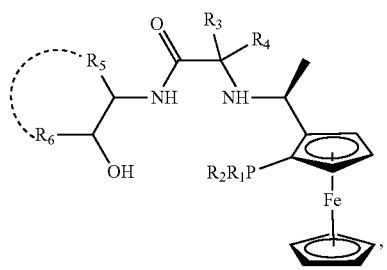

I wherein $R_1$ and $R_2$ each are independently an alkyl group or an aryl group; $R_3$ and $R_4$ each are independently an alkyl group, an aryl group, or hydrogen; $R_5$ and $R_6$ each are independently an alkyl group or an aryl group; and $R_5$ and $R_6$ form a ring or not.

In an embodiment, the alkyl group is a $C_1$-$C_6$ alkyl group; the $C_1$-$C_6$ alkyl group is selected from the group consisting of methyl, ethyl, propyl, isopropyl, n-butyl, isobutyl, sec-butyl, tert-butyl, n-pentyl, sec-pentyl, 1-ethylpropyl, 2-methylbutyl, tert-pentyl, 1,2-dimethylpropyl, iso-pentyl, neopentyl, n-hexyl, iso-hexyl, sec-hexyl, tert-hexyl, neopentyl, 2-methylpentyl, 1,2-dimethylbutyl, and 1-ethylbutyl; and the aryl group is a phenyl group.

In an embodiment, the chiral multidentate ligand is selected from the group consisting of L1-L10, shown as:

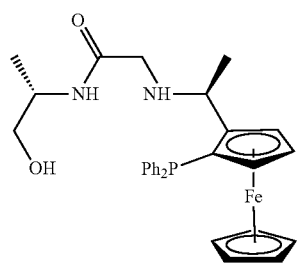

L1

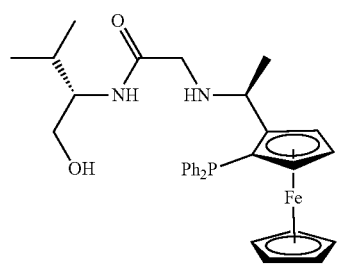

L2

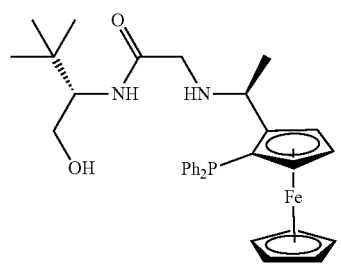

L3

-continued

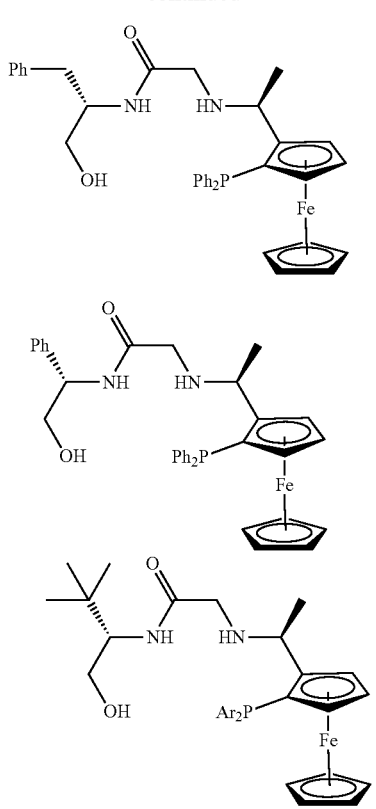

L6: Ar = 4-MeC$_6$H$_4$
L7: Ar = 3,5-Me$_2$C$_6$H$_3$
L8: Ar = 3,5-$^t$Bu$_2$C$_6$H$_3$
L9: Ar = 4-MeO-3,5-$^t$Bu$_2$C$_6$H$_2$

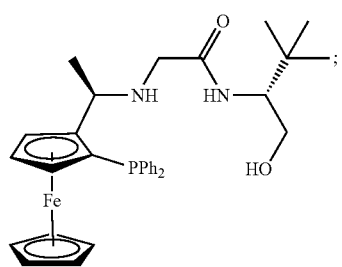

wherein each chiral multidentate ligand contains two enantiomers.

In an embodiment, the chiral multidentate ligand is L1, L2, L3, or L10.

In an embodiment, the chiral multidentate ligand is L3 or L10.

A second object of this application is to provide a method for preparing the chiral multidentate ligand of formula (I), comprising:

(S1) subjecting compound (M1) containing an amino-protecting group and compound (M2) to undergo a condensation reaction to obtain compound (M3); and subjecting the compound (M3) to amine deprotection in the presence of a deprotection reagent to obtain compound (M4); wherein when the amino-protecting group is a t-butyloxy carbonyl (Boc) group, the deprotection reagent is selected from the group consisting of trifluoroacetic acid, methanesulfonic acid, hydrochloric acid, sulfuric acid, and phosphoric acid; and when the amino-protecting group is a benzyloxycarbonyl (Cbz) group, the amino-protecting group is removed by Pd/C catalysts or Pd (OH)$_2$/C catalyst in a hydrogen atmosphere;

(S2) subjecting compound (1) to deprotonation by butyl lithium and phosphorization to produce compound (2); and substituting a dimethylamino group in the compound (2) with an acetoxy group to obtain compound (3); and (S3) reacting the compound (3) with the compound (M4) in the presence of triethylamine to produce chiral multidentate ligands L1-L9, wherein an enantiomer L10 of a chiral multidentate ligand L3 is synthesized from corresponding chiral raw materials through a method of preparing the chiral multidentate ligand L3, as shown in the following reaction scheme:

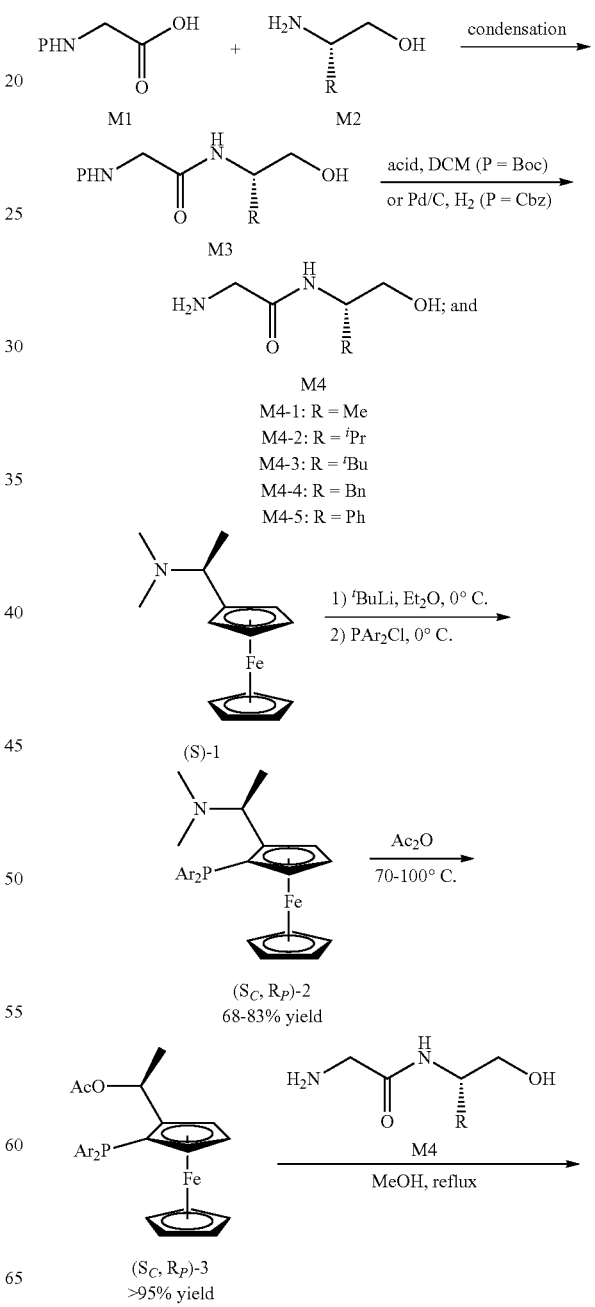

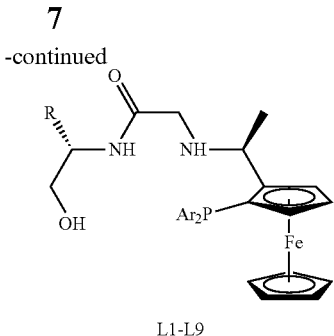

L1-L9

L1: Ar = Ph, R = Me
L2: Ar = Ph, R = $^i$Pr
L3: Ar = Ph, R = $^t$Bu
L4: Ar = Ph, R = Bn
L5: Ar = Ph, R = Ph
L6: Ar = Ar = 4-MeC$_6$H$_4$, R = $^t$Bu
L7: Ar = 3,5-Me$_2$C$_6$H$_3$, R = $^t$Bu
L8: Ar = 3,5-$^t$Bu$_2$C$_6$H$_3$, R = $^t$Bu
L9: Ar = 4-MeO-3,5-$^t$Bu$_2$C$_6$H$_2$, R = $^t$Bu

L10

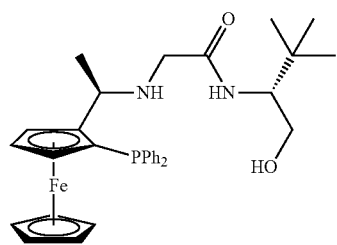

A third object of this application is to provide a catalyst, comprising:
the chiral multidentate ligand of formula (I); and
a precursor containing a transition metal;
wherein the transition metal is selected from the group consisting of ruthenium, rhodium, iridium, ferrum, cobalt, nickel, manganese, and copper.

In an embodiment, the precursor is selected from the group consisting of [Ir(NBD)Cl]$_2$, [Ir(NBD)$_2$]X, [Ir(COD)Cl]$_2$, [Ir(COD)$_2$]X, [Rh(NBD)$_2$]X, [Rh(NBD)Cl]$_2$, Rh(acac)(CO)$_2$, [Rh(COD)Cl]$_2$, Rh(ethylene)$_2$(acac), [Rh(ethylene)$_2$Cl]$_2$, [Rh(COD)$_2$]X, RhCl(PPh$_3$)$_3$, Ru(aryl group)X$_2$, RuX$_2$(L)$_2$(diphosphine), Ru(arene)X$_2$(diphosphine), Ru(methallyl)$_2$(diphosphine), Ru(aryl group)X$_2$(PPh$_3$), RuX$_2$(cymene), RuCl$_2$(COD), (Ru(COD)$_2$)X, RuX$_2$(diphosphine), Ru(ArH)Cl$_2$, Ru(COD)(methallyl)$_2$, (Ni(allyl)X)$_2$, Ni(acac)$_2$, Ni(COD)$_2$, NiX$_2$, MnX$_2$, Mn(acac)$_2$, CoX$_2$, FeX$_2$, CuX, CuX$_2$, AgX, [Pd(allyl)Cl]$_2$; PdCl$_2$, Pd(OAc)$_2$, and Pd(CF$_3$COO)$_2$;
wherein in the precursor, R is an alkyl group, an alkoxy group, or a substituted alkyl group; aryl is an aryl group; X is a negative anion; Ar is 3,5—difluoromethyl benzene or fluorobenzene; and L is a solvent molecule In an embodiment, X is selected from the group consisting of Cl$^-$, Br$^-$, I$^-$, BF$_4^-$, ClO$_4^-$, SbF$_6^-$, PF$_6^-$, TfO$^-$, RCOO$^-$, and B(Ar)$_4^-$.

In an embodiment, L is CH$_3$CN or N,N-Dimethylformamide (DMF).

A fourth object of this application is to provide a method for preparing a chiral alcohol through an asymmetric hydrogenation reaction, comprising:
applying the aforementioned catalyst to the asymmetric hydrogenation reaction.

In an embodiment, the method further comprising:
reacting the precursor and the chiral multidentate ligand in a first solvent to obtain the catalyst;
mixing the catalyst and a substrate in a second solvent followed by addition of a base to obtain a reaction mixture;
transferring the reaction mixture to a stainless-steel autoclave; and
subjecting the reaction mixture to hydrogen substitution three times followed by the asymmetric hydrogenation reaction at a temperature in the presence of hydrogen gas, slow release of the hydrogen gas, filtration, and rotary evaporation to produce the chiral alcohol.

In an embodiment, wherein the first solvent and the second solvent are independently selected from the group consisting of isopropanol, ethanol, toluene, n-hexane, dichloromethane, tetrahydrofuran, methyl tert-butyl ether, and a combination thereof, preferably isopropanol, toluene, or a combination thereof; and the base is selected from the group consisting of potassium tert-butoxide, sodium tert-butoxide, lithium tert-butoxide, potassium hydroxide, sodium hydroxide, lithium hydroxide, sodium carbonate, potassium carbonate, cesium carbonate, and a combination thereof, preferably potassium tert-butoxide, potassium hydroxide, sodium hydroxide, potassium carbonate, or a combination thereof.

In an embodiment, the asymmetric hydrogenation reaction is performed at 20-80° C. and 10-80 atm, preferably at 20-50° C. and 20-50 atm.

In an embodiment, the catalyst is applied to synthesis of phenylephrine, mirabelon, ticagrelor, or benazepril, shown as:

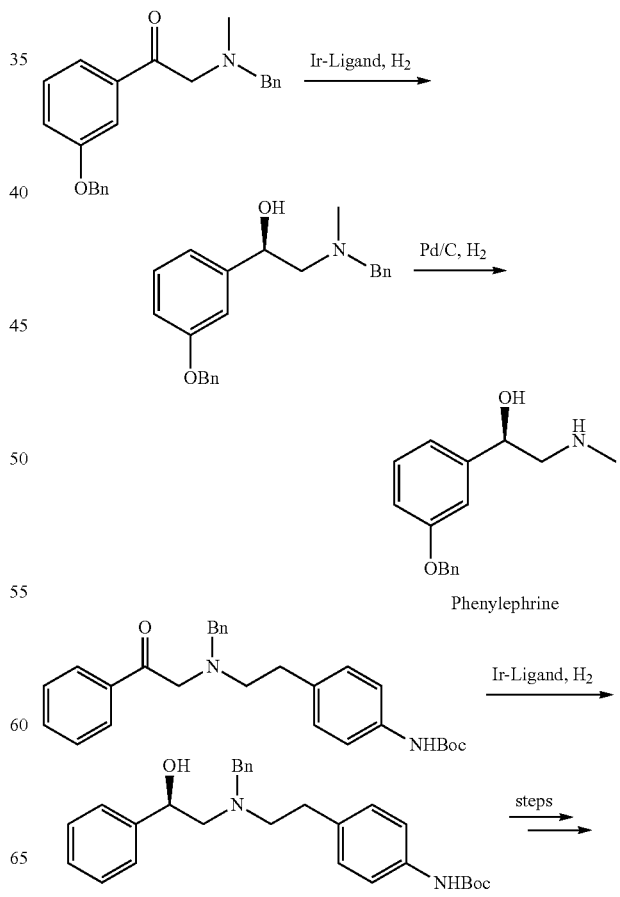

-continued

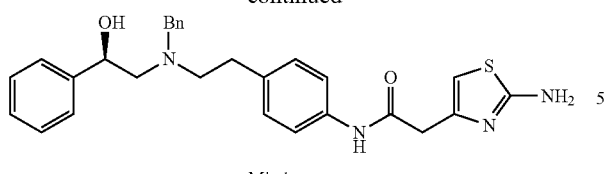
Mirabegron

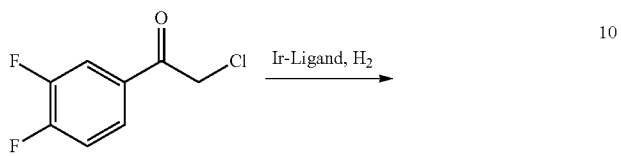

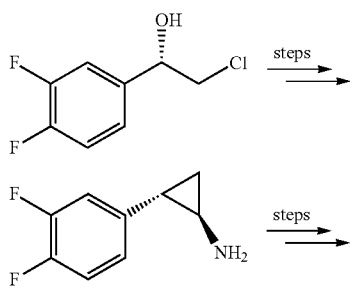

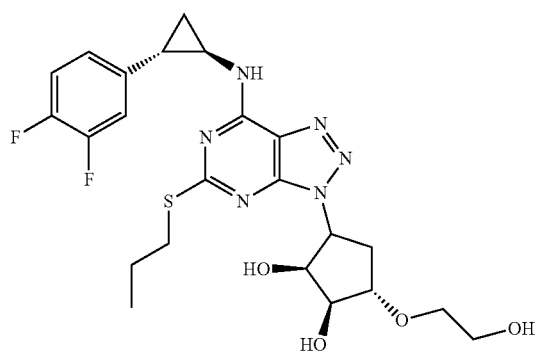
Ticagrelor

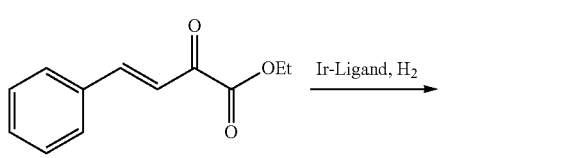

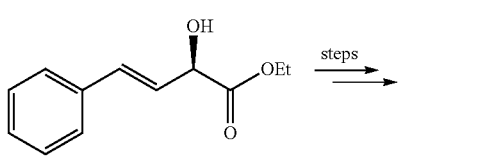

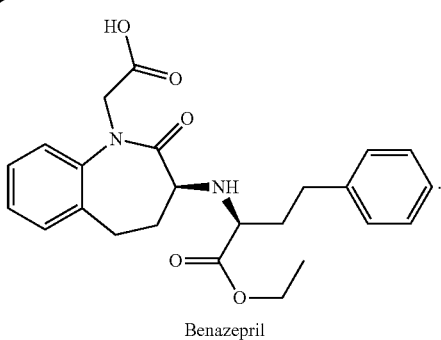
Benazepril

A fifth object of this application is to provide a compound of formula (M4-3):

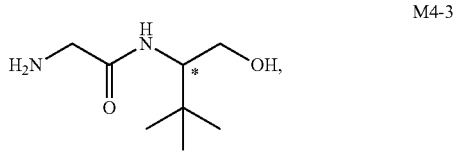
M4-3 wherein *represents that the compound (M4-3) comprises R and S configurations.

A sixth object of this application is to provide a compound of formula (M3-3):

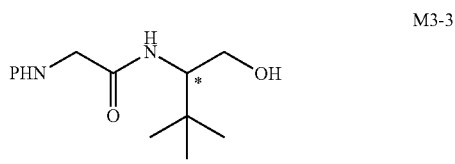
M3-3 wherein P is an amino-protecting group; and * represents that the compound (M3-3) comprises R and S configurations.

In an embodiment, P is a Cbz group or a Boc group.

Compared to the prior art, this application has the following beneficial effects.

(1) This application provides a chiral multi-dentate ligand and a synthesis method thereof. The chiral multi-dentate ligand provided herein is flexible and variable, adjustable in steric structure and electrical properties, and universal. The synthesis method is low-cost, simple, and suitable for industrial production.

2) Through extensive experimental studies, it has been found that the catalytic system formed by the chiral multi-dentate ligand and metallic iridium has extremely high reactivity in asymmetric hydrogenation reactions, with a turn over number (TON) as high as one million (1,000,000) and a stereoselectivity up to 99.9% ee.

(3) This application has the advantages of simple operation, high stability, good applicability, low cost, environmental friendliness, and good industrialization prospect, which bring huge economic benefits, and has high commercialization value.

DETAILED DESCRIPTION OF EMBODIMENTS

Figure 1:
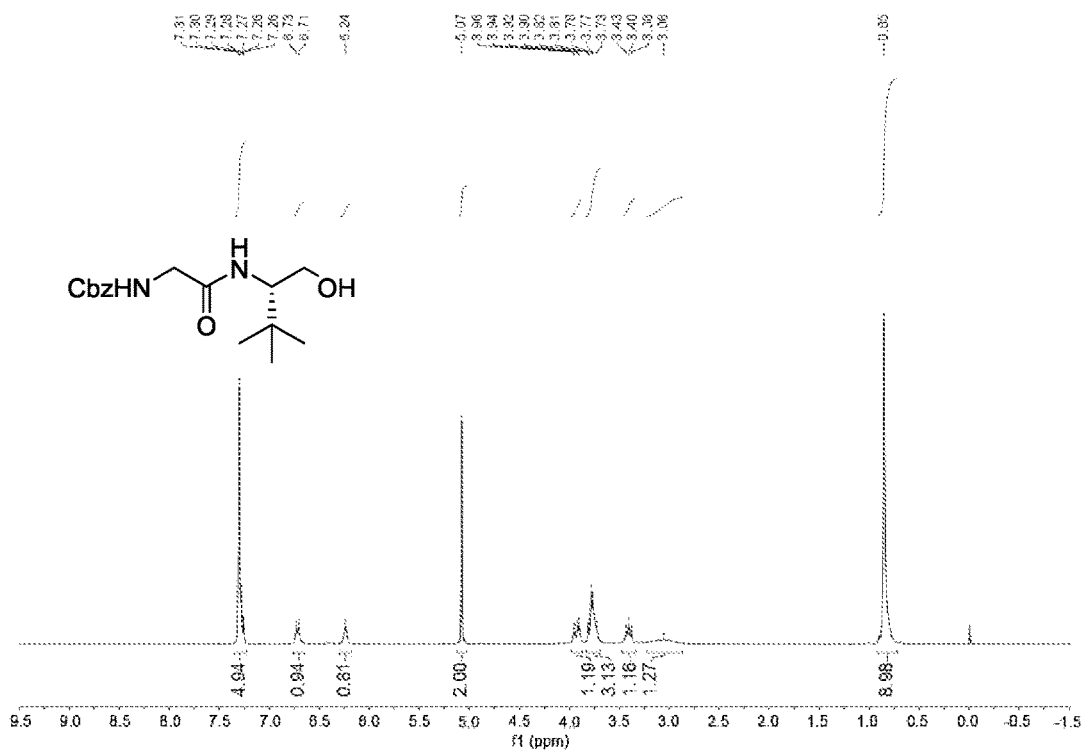
FIG. 1 is a nuclear magnetic resonance (NMR) hydrogen spectrum of compound M3-3 according to an embodiment of the present disclosure, where R is $^t$Bu, and P is benzyloxycarbonyl (Cbz)

This application will be described in detail below with reference to the embodiments, but these embodiments are not intended to limit the scope of this application.

Example 1 Preparation of an Intermediate Compound ($S_C$, $R_P$)-2

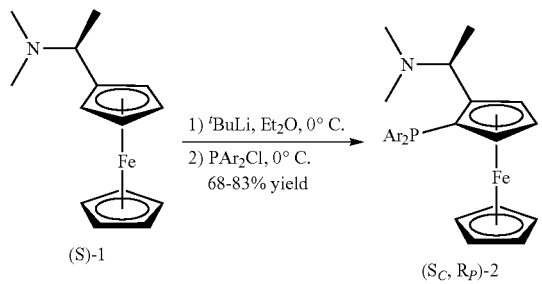

A solution of compound (S)-1 (15 g, 58 mmol, 1.0 equiv.) in anhydrous ethyl ether (145 mL) was added dropwise with a solution of BuLi (30 mL) in hexane (2.3 mol/L, 1.2 equiv.) under stirring in the presence of $N_2$ at 0° C., naturally restored to the room temperature and stirred for 4.0 h. The reaction mixture was added dropwise with $Ar_2PCl$ (70 mmol, 1.2 equiv.) under reflux and continued to reflux for about 4 h. After the reaction was confirmed by thin-layer chromatography (TLC) to be completed, the reaction mixture was added with water for quenching and extracted with ether to obtain an organic phase. The organic phase was dried with anhydrous sodium sulfate, filtered, and evaporated to obtain a red oily liquid. After that, the red oily liquid was beaten with a certain amount of ethyl ether to obtain an orange-yellow solid product as the compound ($S_C$, $R_P$)-2 (65%-83% yield).

Example 2 Preparation of an Intermediate Compound ($S_C$, $R_P$)-3

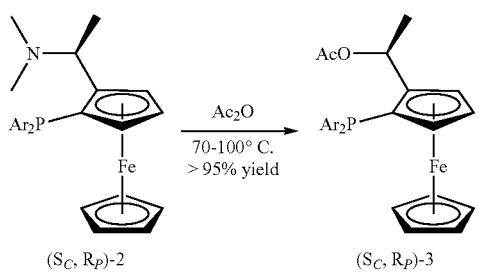

A mixture of compound ($S_C$, $R_P$)-2 (30 mmol) and acetic anhydride (24 mL) was heated under protection of nitrogen at 100° C. for about 1.0 h. After the reaction was confirmed by TLC to be completed, the reaction mixture was evaporated under reduced pressure to obtain an orange solid as the compound ($S_C$, $R_P$)-3 with a yield of more than 95%. Then the compound ($S_C$, $R_P$)-3 was directly used in the next procedures without purification.

Example 3 Preparation of an Intermediate Compound M3

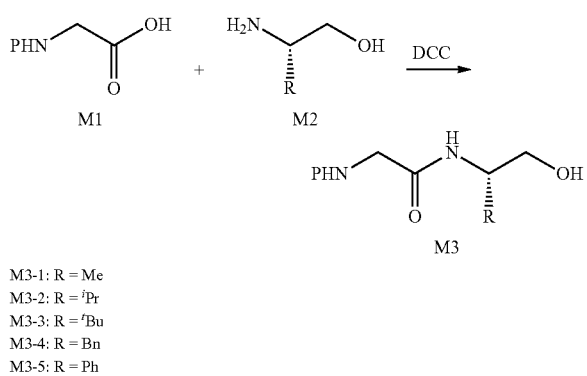

M3-1: R = Me
M3-2: R = $^i$Pr
M3-3: R = $^t$Bu
M3-4: R = Bn
M3-5: R = Ph

N-protecting group-containing glycine (M1) (1.2 eq) and chiral amino alcohol (M2) (1.0 eq) were dissolved in dichloromethane and subjected to a condensation reaction in the presence of a condensation agent dicyclohexylcarbodiimide (DCC) (1.5 eq). After the reaction was confirmed by TLC to be completed, the reaction mixture was filtered to remove a by-product (solid N,N'-dicyclohexylurea) to obtain a crude amide intermediate (M3), which was then purified by column separation to obtain a pure compound M3 (76%-88% yield). Characterization data was shown as follows:

compound M3-3 (where R is $^t$Bu, and P is benzyloxycarbonyl (Cbz)): $^1H$ NMR (400 MHz, $CDCl_3$) δ 7.31-7.26 (m, 5H), 6.72 (d, J=9.6 Hz, 1H), 6.24 (s, 1H), 5.07 (s, 2H), 3.93 (dd, J=16.6, 6.0 Hz, 1H), 3.82-3.73 (m, 3H), 3.40 (t, J=10.3 Hz, 1H), 3.06 (br, 1H), 0.85 (s, 9H). $^{13}C$ NMR (101 MHz, $CDCl_3$) δ 170.75, 157.04, 136.10, 128.46, 128.14, 127.98, 67.05, 61.62, 59.54, 44.53, 33.45, 26.59; and compound M3'-3 (where R is $^t$Bu, and P is t-butyloxy carbonyl (Boc)): $^1H$ NMR (400 MHz, $CDCl_3$) δ 6.58 (d, J=9.1 Hz, 1H), 5.62 (s, 1H), 3.89-3.69 (m, 4H), 3.49 (s, 1H), 3.30 (s, 1H), 1.44 (s, 9H), 0.93 (s, 9H). $^{13}$C NMR (101 MHz, CDCl$_3$) δ 170.98, 156.53, 80.40, 62.37, 59.72, 44.78, 33.46, 28.26, 26.74.

Example 4 Preparation of an Intermediate Compound M4

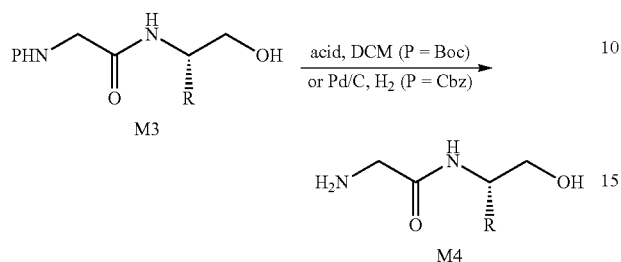

M4-1: R = Me
M4-2: R = $^i$Pr
M4-3: R = $^t$Bu
M4-4: R = Bn
M4-5: R = Ph

Compound M3 (where P is Boc) was dissolved in trifluoroacetic acid/dichloromethane (V:V=1:1) followed by reaction at room temperature for 4 h. After the reaction was confirmed by TLC to be completed, the reaction mixture was evaporated to remove the solvent and excess trifluoroacetic acid. The residue was neutralized with a saturated solution of sodium bicarbonate followed by extraction with dichloromethane (3 times). The organic phases were combined, dried with anhydrous sodium sulfate, and filtered to obtain a compound M4 with a crude yield of higher than 90%. The compound M4 was directly used in the next procedures without purification.

Compound M3' (where P is Cbz) was dissolved in methanol and added with 5% Pd/C. The reaction suspension was placed in an autoclave, subjected to nitrogen substitution 3 times, hydrogen substitution 3 times, addition of 5-10 atm hydrogen, and reaction at room temperature for 12 h. After that, the hydrogen was slowly released carefully and the Pd/C was filtered out to obtain a compound M4 with a crude yield of higher than 98%. The compound M4 was directly used in the next procedures without purification. Characterization data was shown as follows:

compound M4 (where R is $^t$Bu): $^1$HNMR (400 MHz, CDCl$_3$) δ 7.59 (d, J=8.9 Hz, 1H), 3.85 (dd, J=11.2, 3.2 Hz, 1H), 3.76 (td, J=8.9, 3.2 Hz, 1H), 3.50 (dd, J=11.2, 8.6 Hz, 1H), 3.37 (s, 2H), 2.39 (s, 3H), 0.94 (s, 9H). $^{13}$C NMR (101 MHz, CDCl$_3$) δ 174.07, 62.99, 59.74, 44.56, 33.35, 26.82.

Example 5 Preparation of a Chiral Multidentate Ligand L1

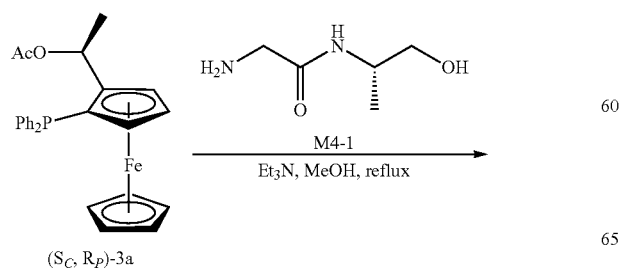

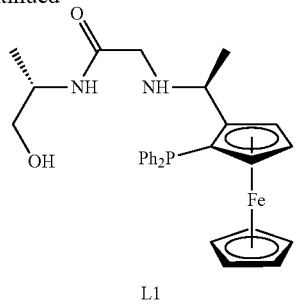

L1

To a 50 mL reaction tube were added acetate 3a (0.91 g, 2.0 mmol) and compound M4-1 (0.29 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L1(0.63 g, 61% yield).

$^1$H NMR (400 MHz, CDCl$_3$) δ 7.53-7.49 (m, 2H), 7.37-7.35 (m, 3H), 7.24-7.18 (m, 5H), 4.42 (s, 1H), 4.29 (s, 1H), 4.16-4.09 (m, 1H), 3.96 (s, 5H), 3.85-3.76 (m, 2H), 3.51-3.43 (m, 1H), 3.41-3.34 (m, 1H), 2.86 (dd, J=16.0 Hz, 60.0 Hz, 2H), 1.37 (d, J=8.2 Hz, 3H), 1.04 (d, J=4.3 Hz, 3H); $^{13}$C NMR (101 MHz, CDCl$_3$) δ 173.61, 140.10 (d, J=9.2 Hz), 136.88 (d, J=9.2 Hz), 134.96, 134.81, 132.51 (d, J=18.5 Hz), 129.31, 128.48 (d, J=2.0 Hz), 128.49, 128.28 (d, J=8.2 Hz), 96.53, 96.29, 75.23 (d,J=8.2 Hz), 71.73 (d,J=4.3 Hz), 69.77, 69.58 (d,J=4.3 Hz), 69.24, 67.62, 51.73 (d, J=8.2 Hz), 48.62, 48.08, 19.00, 16.80; $^{31}$P NMR (101 MHz, CDCl$_3$) δ −24.85.

Example 6 Preparation of a Chiral Multidentate Ligand L2

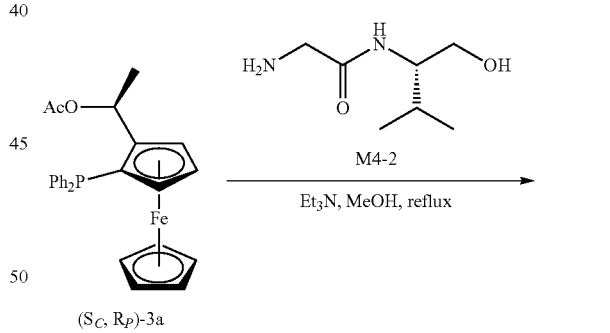

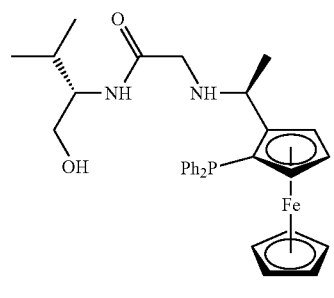

L2

To a 50 mL reaction tube were added acetate 3a (0.91 g, 2.0 mmol) and compound M4-2 (0.35 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L2 (0.61 g, 55% yield).

$^1$H NMR (400 MHz, CDCl$_3$) δ 7.54-7.50 (m, 2H), 7.44-7.37 (m, 4H), 7.27-7.20 (m, 4H), 4.43 (s, 1H), 4.30 (s, 1H), 4.20-4.16 (m, 1H), 3.98 (s, 5H), 3.83 (s, 1H), 3.63-3.58 (m, 1H), 3.53-3.41 (m, 2H), 2.87 (dd, J=17.0 Hz, 66.7 Hz, 2H), 1.88-1.76 (m, 1H), 1.43 (d, J=8.2 Hz, 3H), 0.92 (d, J=8.2 Hz, 3H), 0.88 (d, J=8.2 Hz, 3H); $^{13}$C NMR (101 MHz, CDCl$_3$) δ 173.89, 140.13 (d, J=10.4 Hz), 136.99 (d, J=8.5 Hz), 135.01, 134.81, 132.52 (d, J=18.1 Hz), 129.32, 128.51 (d, J=1.9 Hz), 128.19 (d, J=7.1 Hz), 96.58, 96.28, 75.21 (d, J=8.2 Hz), 71.72 (d, J=4.2 Hz), 69.76, 69.60, 69.49, 69.20, 64.61, 57.79, 51.64 (d, J=8.2 Hz), 48.39, 28.77, 19.59, 19.12, 19.05; $^{31}$P NMR (101 Hz, CDCl$_3$) δ-24.73.

Example 7 Preparation of a Chiral Multidentate Ligand L3

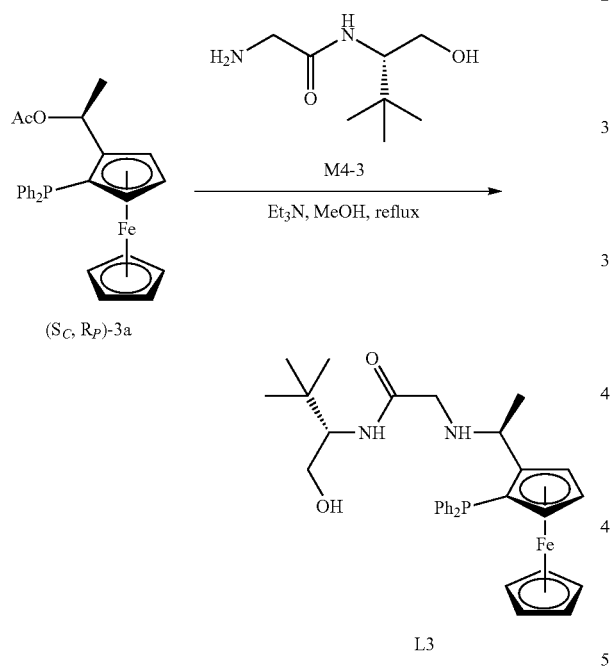

To a 50 mL reaction tube were added acetate 3a (0.91 g, 2.0 mmol) and compound M4-3 (0.38 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L3 (0.58 g, 51% yield).

$^1$H NMR (400 MHz, CDCl$_3$) δ 7.50-7.47 (m, 3H), 7.25-7.21 (m, 3H), 7.21-7.13 (m, 4H), 4.41 (s, 1H), 4.30 (s, 1H), 4.20-4.18 (m, 1H), 3.99 (s, 5H), 3.80-3.74 (m, 2H), 3.62-3.60 (m, 1H), 3.40-3.35 (m, 1H), 2.82 (dd, J=17.5 Hz, 117.2 Hz, 2H), 1.38 (d, J=6.7 Hz, 3H), 0.89 (s, 9H);

$^{13}$C NMR (101 MHz, CDCl$_3$) δ 174.09, 139.70 (d, J=9.7 Hz), 136.74 (d, J=8.6 Hz), 134.81, 134.67, 132.54 (d, J=19.1 Hz), 129.20, 128.66, 128.50 (d, J=6.3 Hz), 128.18 (d, J=7.7 Hz), 96.28 (d, J=23.7 Hz), 75.18 (d, J=7.6 Hz), 71.57 (d, J=4.2 Hz), 69.70, 69.59, 69.56, 69.14, 63.78, 60.30, 51.43 (d, J=8.5 Hz), 48.06, 33.32, 26.94, 19.18;

$^{31}$P NMR (101 MHz, CDCl$_3$) δ-25.04.

Figure 2:
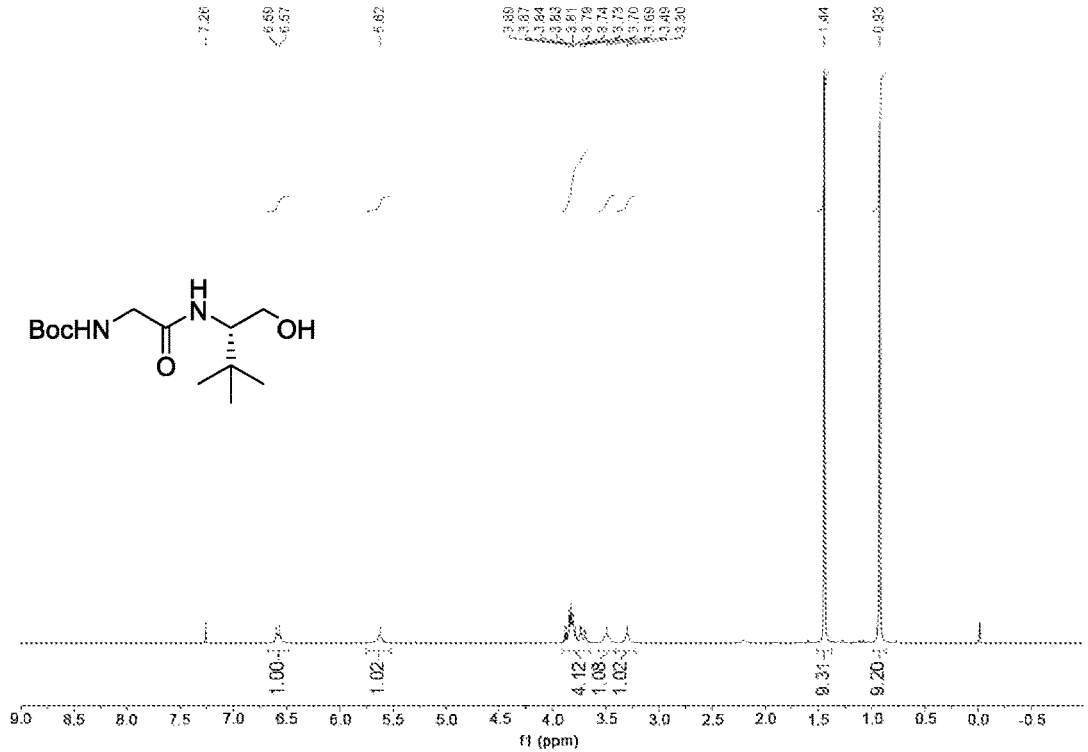
FIG. 2 is an NMR hydrogen spectrum of compound M3-3 according to an embodiment of the present disclosure, where R is $^t$Bu, and P is t-butyloxy carbonyl (Boc)
Figure 3:
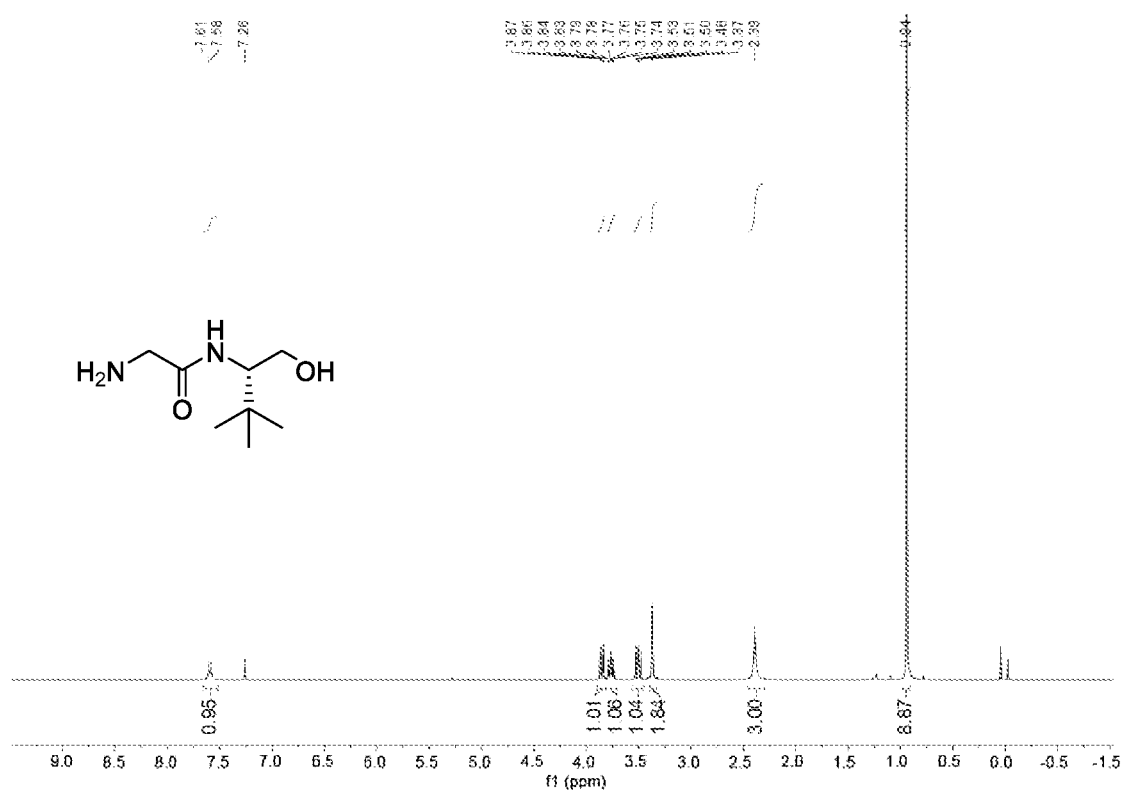
FIG. 3 is an NMR hydrogen spectrum of compound M4-3 according to an embodiment of the present disclosure, where R is $^t$Bu.
Figure 4:
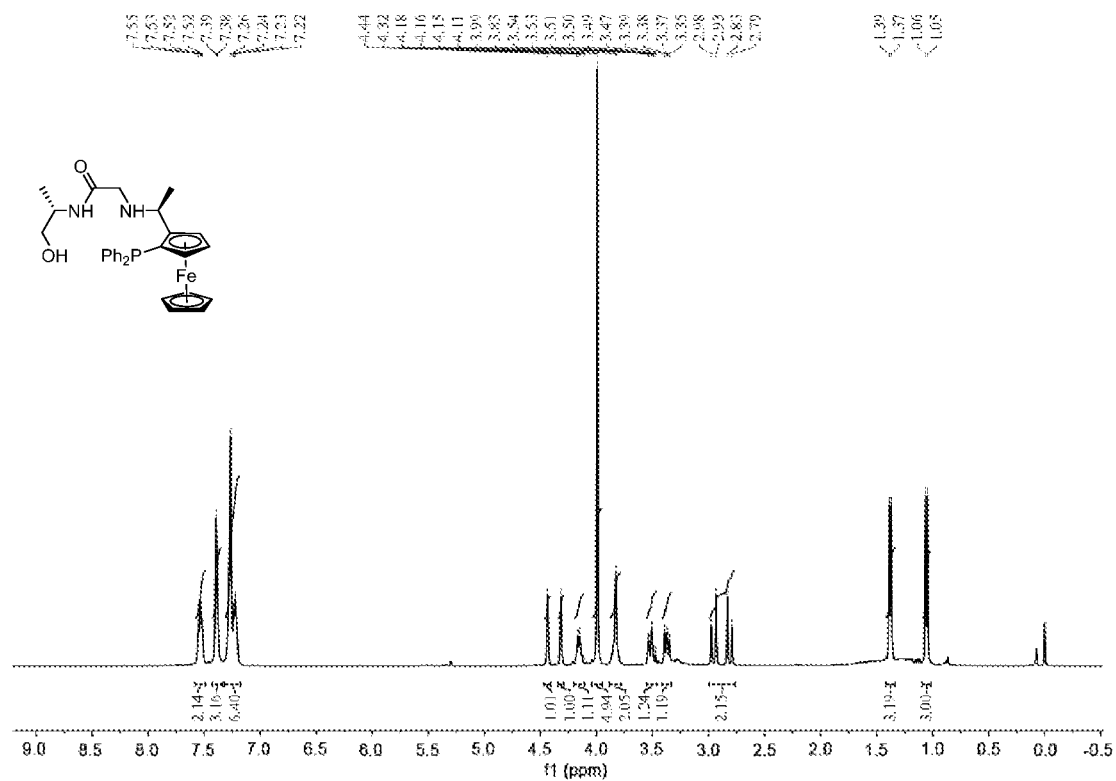
FIG. 4 is an NMR hydrogen spectrum of a chiral multi-dentate ligand L1 according to an embodiment of the present disclosure.
Figure 5:
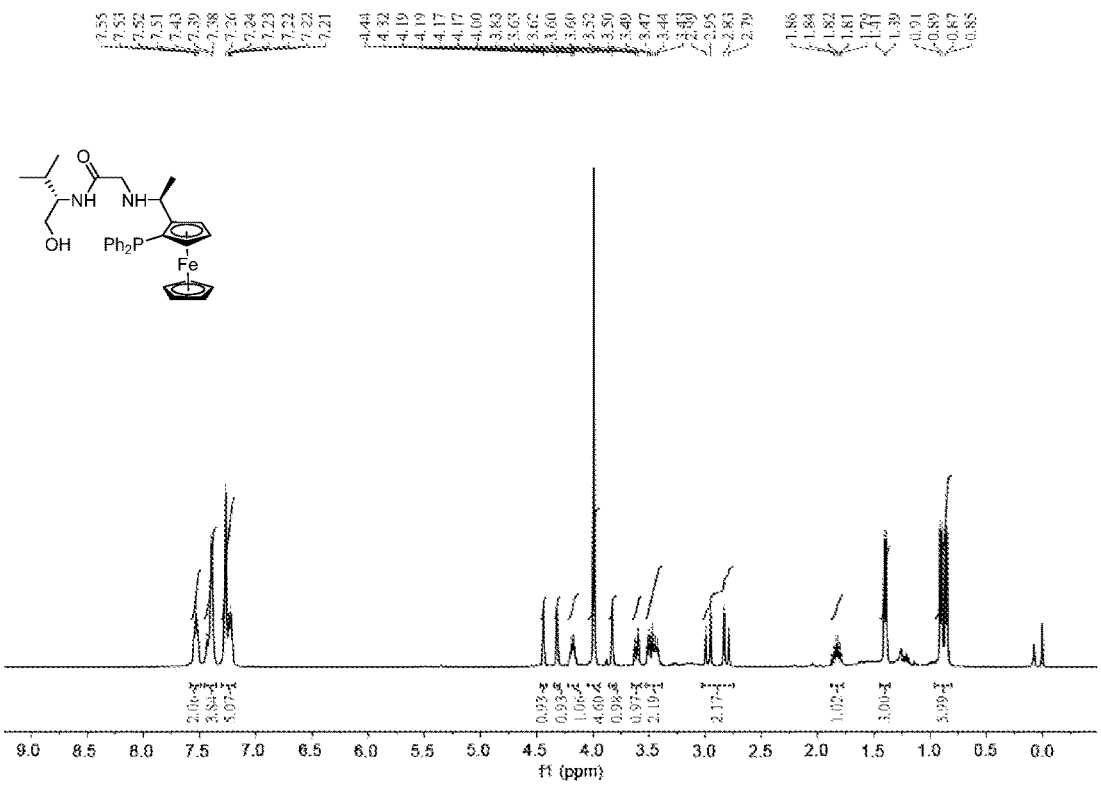
FIG. 5 is an NMR hydrogen spectrum of a chiral multi-dentate ligand L2 according to an embodiment of the present disclosure.
Figure 6:
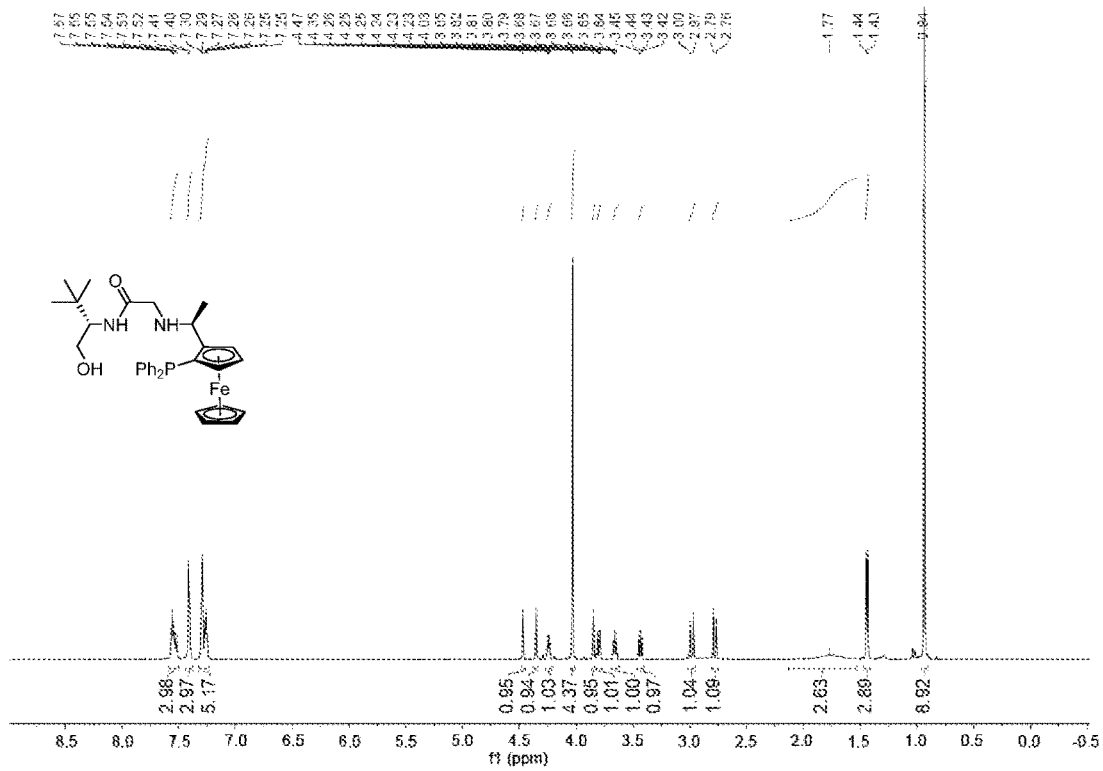
FIG. 6 is an NMR hydrogen spectrum of a chiral multi-dentate ligand L3 according to an embodiment of the present disclosure.
Figure 7:
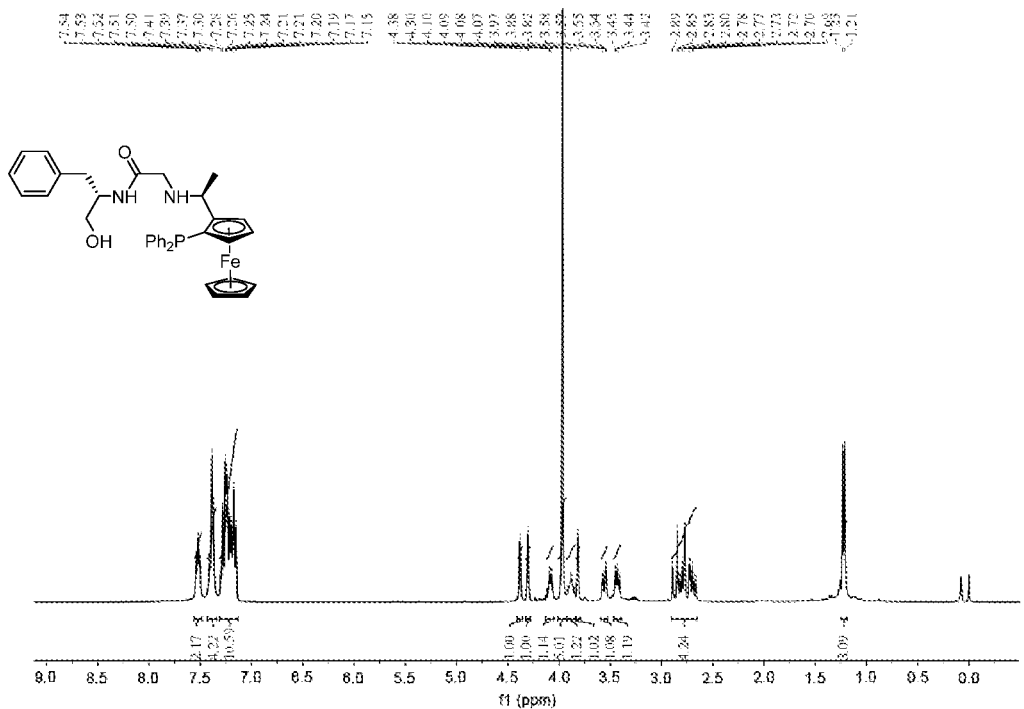
FIG. 7 is an NMR hydrogen spectrum of a chiral multidentate ligand L4 according to an embodiment of the present disclosure.
Figure 8:
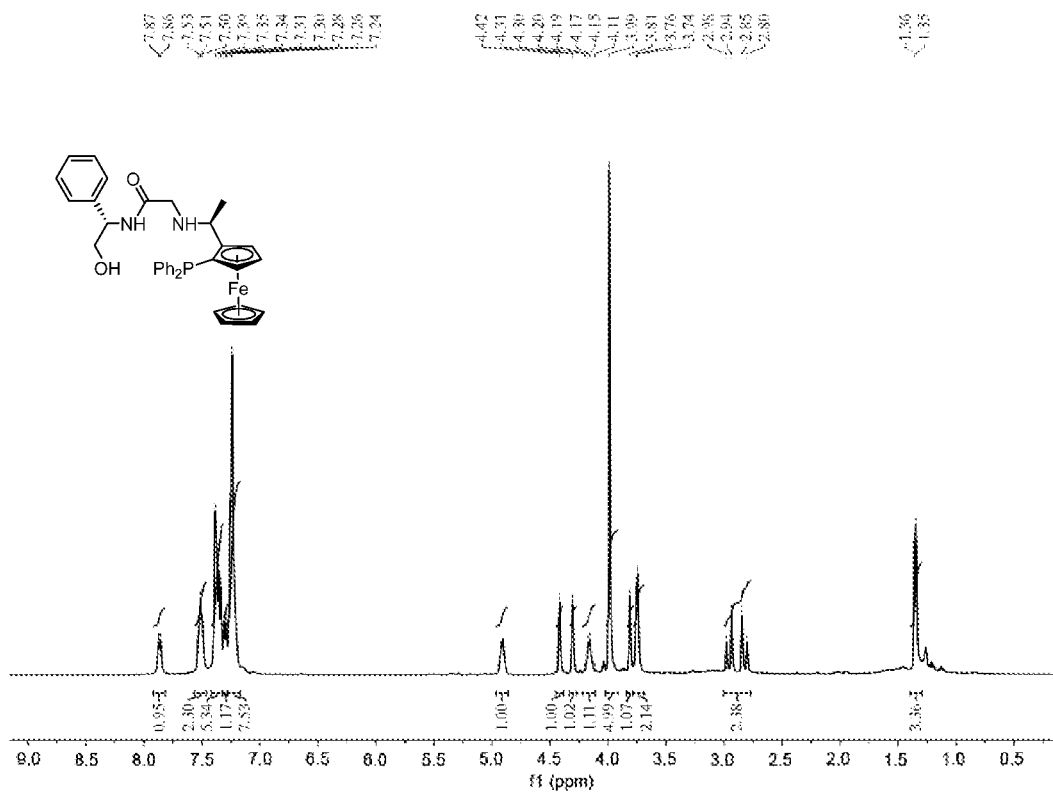
FIG. 8 is an NMR hydrogen spectrum of a chiral multidentate ligand L5 according to an embodiment of the present disclosure.
Figure 9:
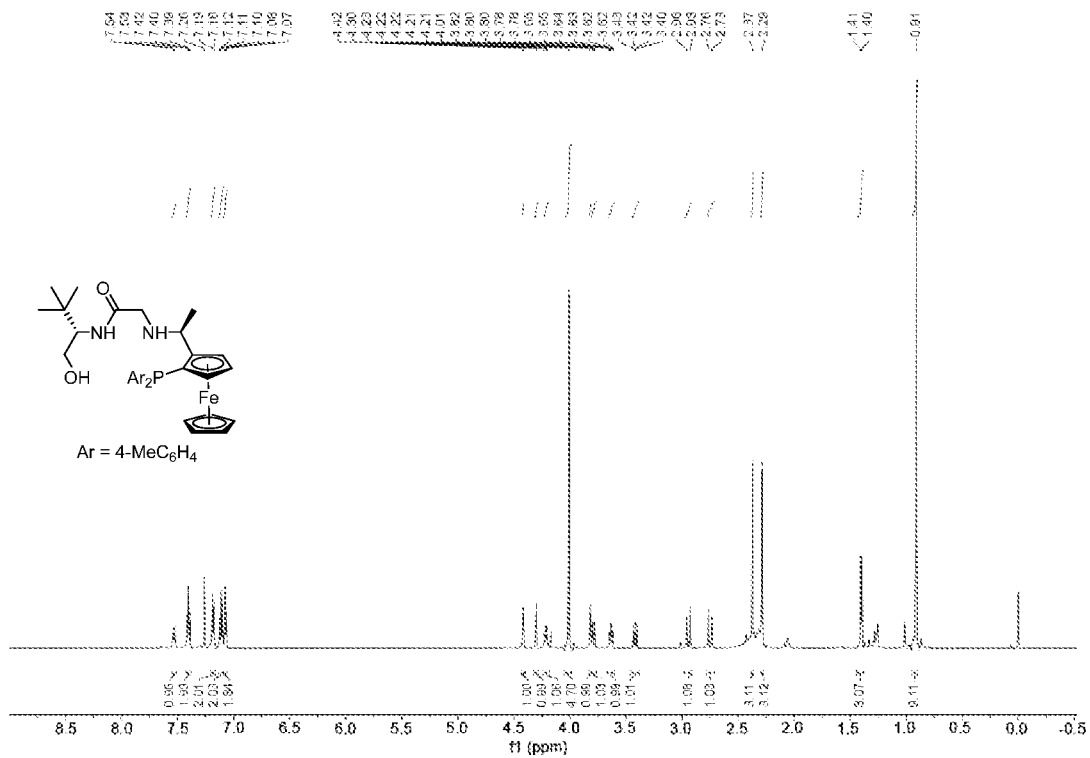
FIG. 9 is an NMR hydrogen spectrum of a chiral multidentate ligand L6 according to an embodiment of the present disclosure.
Figure 10:
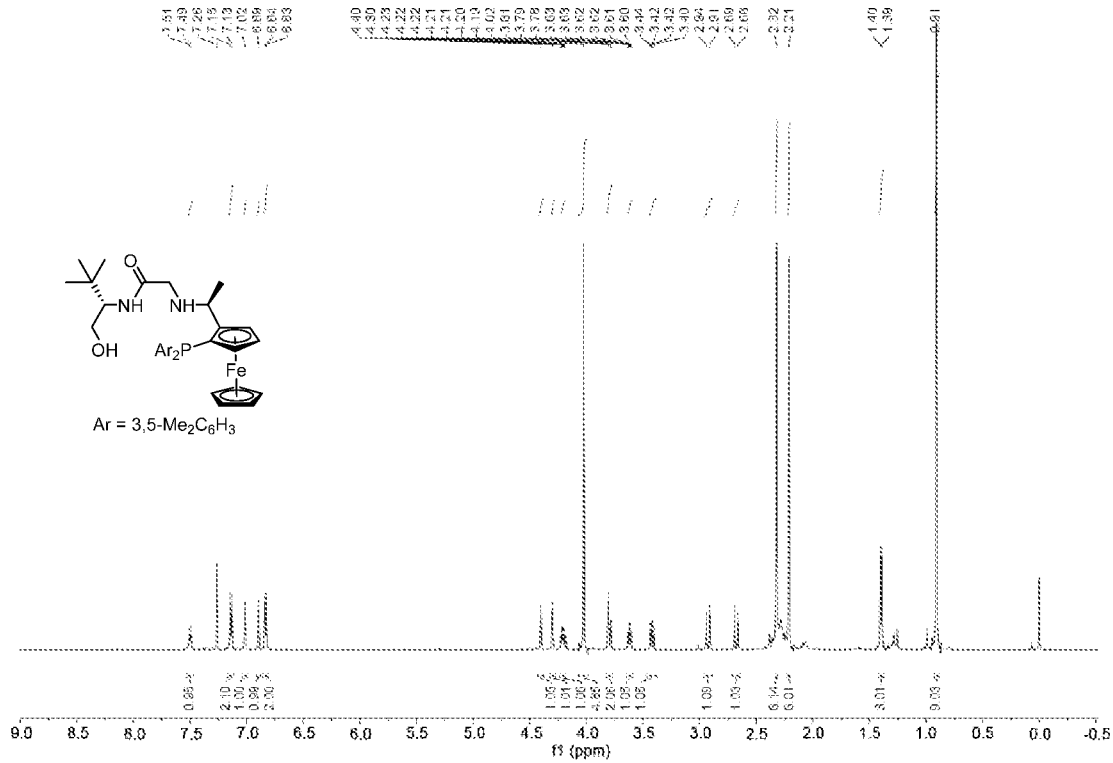
FIG. 10 is an NMR hydrogen spectrum of a chiral multidentate ligand L7 according to an embodiment of the present disclosure.
Figure 11:
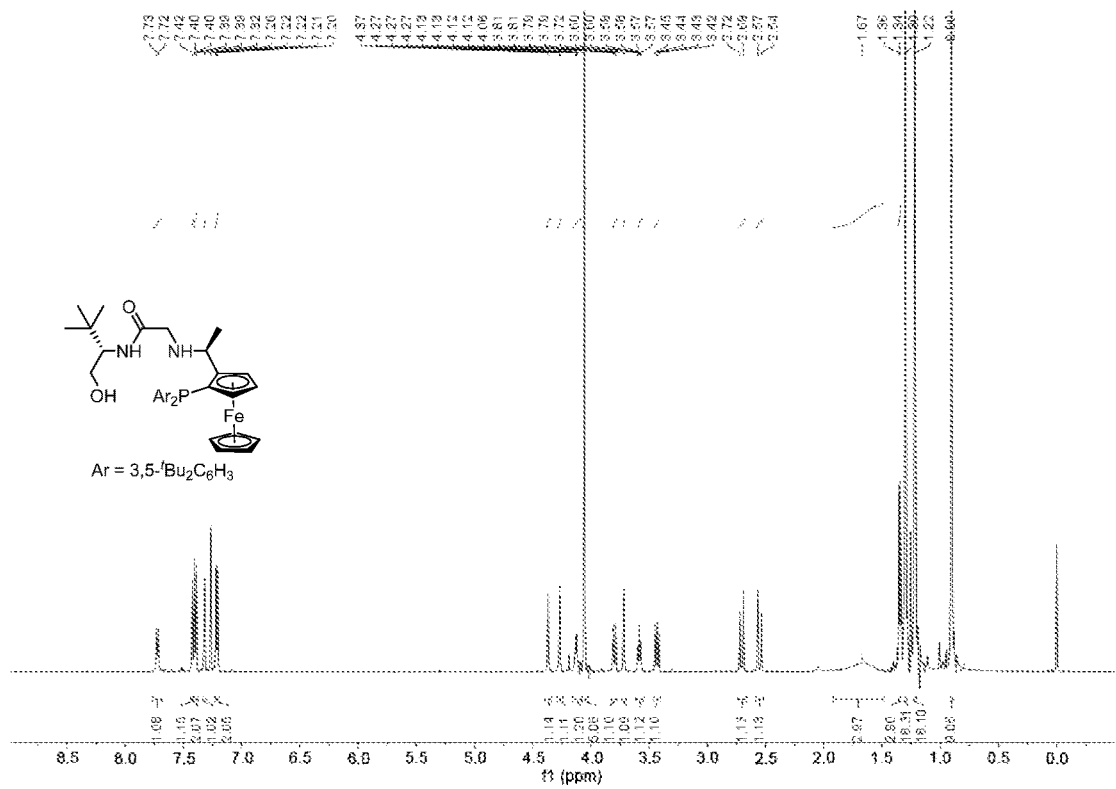
FIG. 11 is an NMR hydrogen spectrum of a chiral multidentate ligand L8 according to an embodiment of the present disclosure.
Figure 12:
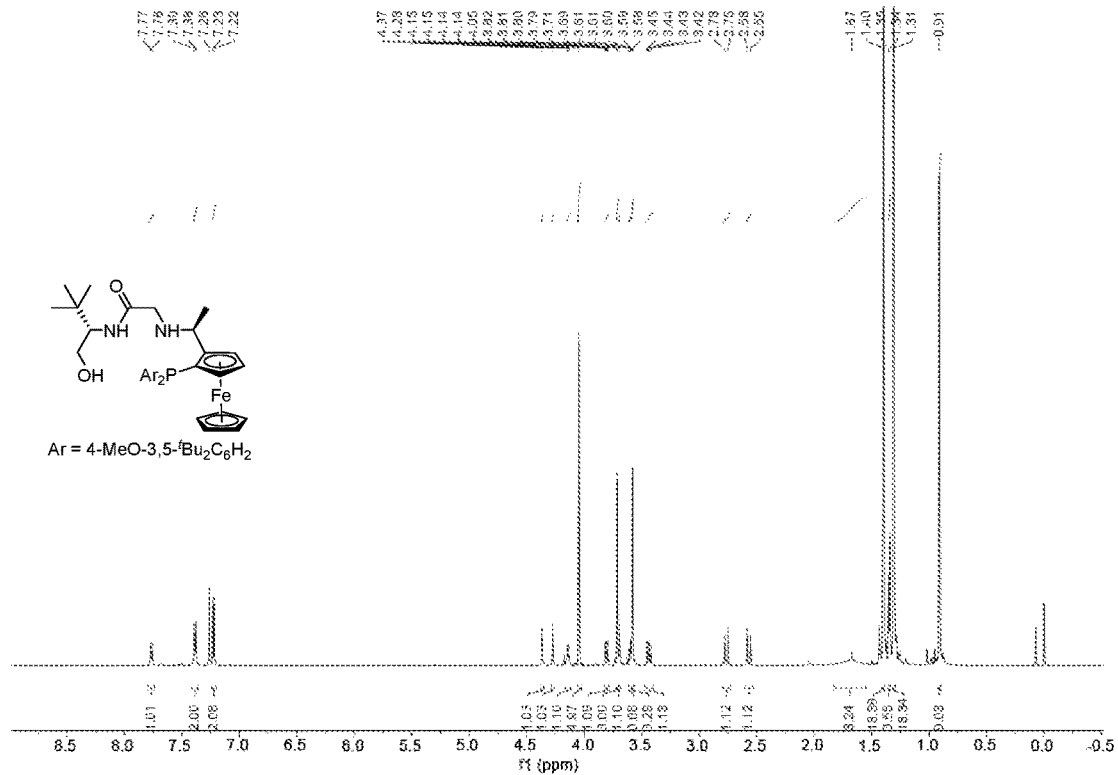
FIG. 12 is an NMR hydrogen spectrum of a chiral multidentate ligand L9 according to an embodiment of the present disclosure.

FIGS. 1-4 are NMR hydrogen spectra of compound M3-3 (where R is $^t$Bu, and P is Cbz), compound M3-3 (where R is $^t$Bu, and P is Boc), compound M4-3 (where R is tBu), and a chiral multidentate ligand L1, respectively.

Example 8 Preparation of a Chiral Multidentate Ligand L4

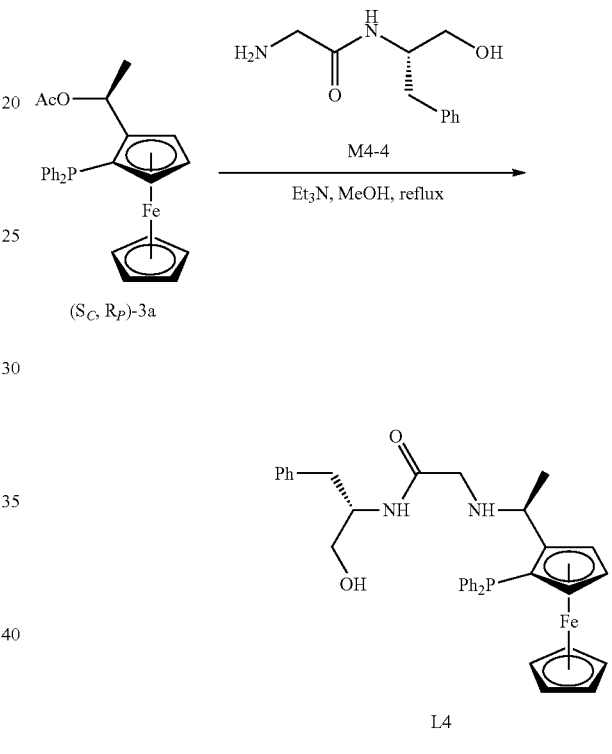

To a 50 mL reaction tube were added acetate 3a (0.91 g, 2.0 mmol) and compound M4-4 (0.46 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L4 (0.74 g, 61% yield).

$^1$H NMR (400 MHz, CDCl$_3$) δ 7.55-7.51 (m, 2H), 7.43-7.29 (m, 4H), 7.30-7.16 (m, 9H), 4.40 (s, 1H), 4.32 (s, 1H), 4.13-4.05 (m, 1H), 3.98 (s, 5H), 3.95-3.82 (m, 1H), 3.81 (s, 1H), 3.59-3.53 (m, 1H), 3.48-3.41 (m, 1H), 2.90-2.67 (m, 4H), 1.19 (d, J=8.0 Hz, 3H);

$^{13}$C NMR (101 MHz, CDCl$_3$) δ 173.63, 140.14 (d, J=9.6 Hz), 137.88, 136.99 (d, J=8.2 Hz), 134.98, 134.78, 132.45 (d, J=18.1 Hz), 129.28, 129.24, 128.57, 128.49, 128.42, 128.20 (d, J=8.2 Hz), 126.60, 96.50 (d, J=24.0 Hz), 75.10 (d, J=7.7 Hz), 71.69 (d, J=4.3 Hz), 69.69, 69.52, 69.43, 69.19, 65.05, 53.58, 51.45 (d, J=8.5 Hz), 48.29, 36.80, 18.73;

$^{31}$P NMR (101 MHz, CDCl$_3$) δ-24.93.

Example 9 Preparation of a Chiral Multidentate Ligand L5

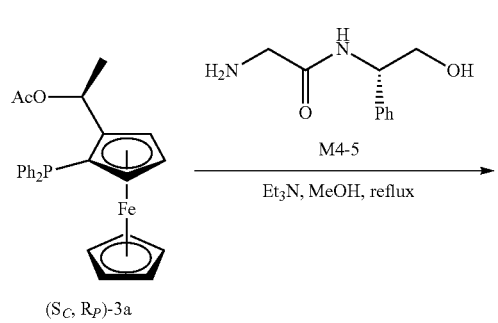

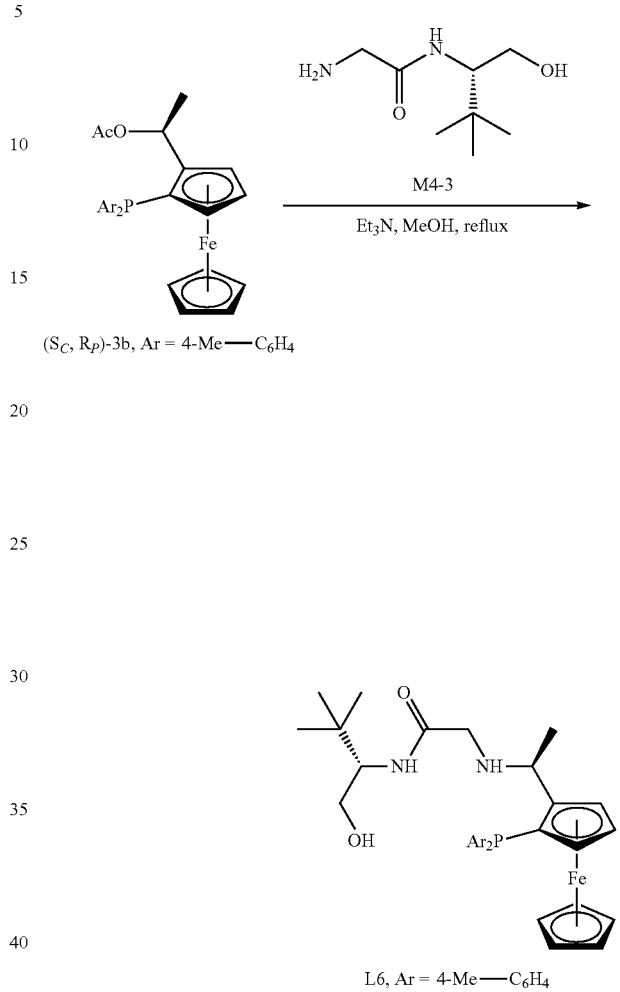

To a 50 mL reaction tube were added acetate 3a (0.91 g, 2.0 mmol) and compound M4-5 (0.43 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L5 (0.68 g, 58% yield).

$^1$H NMR (400 MHz, CDCl$_3$) δ 7.93-7.88 (m, 1H), 7.54-7.49 (m, 2H), 7.41-7.32 (m, 5H), 7.33-7.27 (m, 1H), 7.26-7.23 (m, 6H), 4.97-4.84 (m, 1H), 4.40 (s, 1H), 4.32 (d, J=4.3 Hz, 1H), 4.23-4.10 (m, 1H), 4.02 (s, 5H), 3.78 (s, 1H), 3.73 (d, J=8.7 Hz, 2H), 2.92 (dd, J=18.1 Hz, 56.0 Hz, 2H), 1.34 (d, J=4.0 Hz, 3H);

$^{13}$C NMR (101 MHz, CDCl$_3$) δ 173.40, 139.89 (d, J=9.5 Hz), 138.93, 136.82 (d, J=9.5 Hz), 134.89, 134.75, 132.50 (d, J=18.1 Hz), 129.30, 128.78, 128.61 (d, J=7.5 Hz), 128.50, 128.19 (d, J=8.0 Hz), 127.80, 126.91, 96.32 (d, J=23.5 Hz), 75.21 (d, J=7.7 Hz), 71.71 (d, J=4.0 Hz), 69.79, 69.72, 69.59, 69.23, 67.03, 56.28, 51.65 (d, J=8.0 Hz), 48.51, 18.98;

$^{31}$P NMR (101 MHz, CDCl$_3$) δ−24.95.

Example 10 Preparation of a Chiral Multidentate Ligand L6

To a 50 mL reaction tube were added acetate 3b (0.97 g, 2.0 mmol) and compound M4-3 (0.38 g, 2.2 mmol) followed by nitrogen substitution. Then the reaction mixture was sequentially added with triethylamine (0.41 g, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L6 (0.68 g, 57% yield).

$^1$H NMR (400 MHz, CDCl$_3$) δ 7.60-7.54 (m, 1H), 7.41 (t, J=8.5 Hz, 2H), 7.20 (d, J=7.9 Hz, 2H), 7.15-7.04 (m, 4H), 4.38 (s, 1H), 4.28 (t, J=2.4 Hz, 1H), 4.30-4.18 (m, 1H), 4.00 (s, 5H), 3.82-3.78 (m, 2H), 3.66-3.58 (m, 1H), 3.46-3.39 (m, 1H), 2.82 (dd, J=18.0 Hz, 80.2 Hz, 2H), 2.39 (s, 3H), 2.30 (s, 3H), 1.40 (d, J=4.3 Hz, 3 H), 0.89 (s, 9 H);

$^{13}$C NMR (101 MHz, CDCl$_3$) δ 173.88, 139.23, 138.60, 136.26 (d, J=8.5 Hz), 134.85, 134.62, 133.40 (d, J=8.5 Hz), 132.51 (d, J=19.2 Hz), 129.42, 129.34, 129.08 (d, J=8.5 Hz), 95.80 (d, J=23.4 Hz), 75.81 (d, J=8.0 Hz), 71.71, 69.78, 69.62, 69.56, 69.14, 63.61, 60.35, 51.55 (d, J=9.7 Hz), 47.93, 33.40, 27.00, 21.42, 21.35, 19.23;

$^{31}$P NMR (101 MHz, CDCl$_3$) δ-27.50.

Example 11 Preparation of a Chiral Multidentate Ligand L7

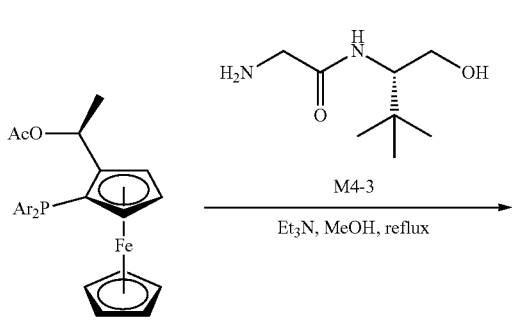

($S_C$, $R_P$)-3c, Ar = 3,5-Me$_2$C$_6$H$_3$

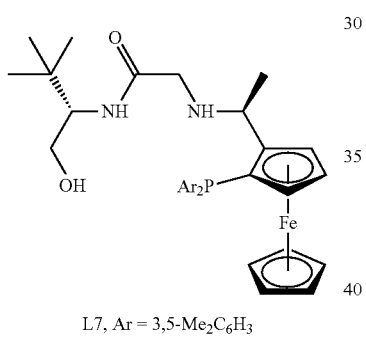

L7, Ar = 3,5-Me$_2$C$_6$H$_3$

To a 50 mL reaction tube were added acetate 3c (1.02 g, 2.0 mmol) and compound M4-3 (0.38 g, 2.2 mmol) followed by nitrogen substitution. Then the reaction mixture was sequentially added with triethylamine (0.17 mL, 1.2 mmol, 3 equiv) and anhydrous methanol (20 mL), followed by stirring at room temperature for 2 h, reflux overnight, evaporation, concentration, and column chromatography to obtain a pale yellow foamy solid as the chiral multidentate ligand L7 (0.66 g, 53% yield).

$^1$H NMR (600 MHz, CDCl$_3$) δ 7.50 (d, J=8.3 Hz, 1H), 7.14 (d, J=8.4 Hz, 2H), 7.02 (s, 1H), 6.89 (s, 1H), 6.83 (d, J=7.6 Hz, 2H), 4.40 (s, 1H), 4.30 (s, 1H), 4.21 (tt, J=6.5, 3.3 Hz, 1H), 4.02 (s, 5H), 3.81 (s, 1H), 3.78 (d, J=2.7 Hz, 1H), 3.62 (td, J=8.4, 2.7 Hz, 1H), 3.42 (dd, J=11.1, 8.5 Hz, 1H), 2.92 (d, J=17.5 Hz, 1H), 2.68 (d, J=17.5 Hz, 1H), 2.32 (s, 6H), 2.21 (s, 6H), 1.40 (d, J=6.7 Hz, 3H), 0.91 (s, 9 H).

$^{13}$C NMR (151 MHz, CDCl$_3$) δ 174.21, 139.16 (d, J=8.9 Hz), 137.92 (d, J=6.8 Hz), 137.49 (d, J=8.0 Hz), 136.31 (d, J=7.9 Hz), 132.33 (d, J=20.4 Hz), 130.84, 130.56, 130.38 (d, J=19.5 Hz), 95.80 (d, J=22.9 Hz), 75.83 (d, J=7.8 Hz), 71.67 (d, J=4.0 Hz), 69.69, 69.37 (d, J=3.5 Hz), 68.83, 63.82, 60.46, 51.23 (d, J=8.8 Hz), 47.67, 33.29, 26.89, 21.31 (d, J=13.0 Hz), 18.93.

$^{31}$P NMR (243 MHz, CDCl$_3$) δ−25.07.

Example 12 Preparation of a Chiral Multidentate Ligand L8

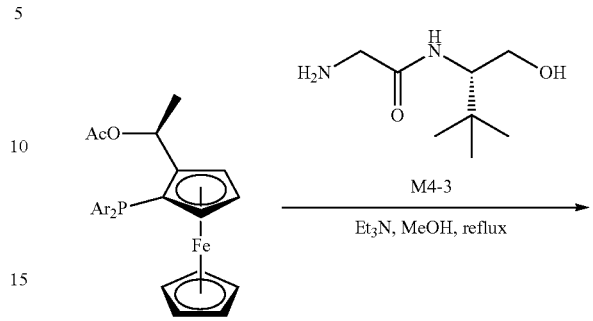

($S_C$, $R_P$)-3d, Ar = 3,5-$^t$Bu$_2$C$_6$H$_3$

L8, Ar = 3,5-$^t$Bu$_2$C$_6$H$_3$

To a 50 mL reaction tube were added acetate 3 d (1.36 g, 2.0 mmol) and compound M4-3 (0.38 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L8 (0.75 g, 47% yield).

$^1$H NMR (600 MHz, CDCl$_3$) δ 7.72 (d, J=8.1 Hz, 1H), 7.42 (s, 1H), 7.40 (dd, J=8.6, 1.6 Hz, 2H), 7.32 (s, 1H), 7.21 (dd, J=8.1, 1.6 Hz, 2H), 4.37 (s, 1H), 4.27 (t, J=2.2 Hz, 1H), 4.13 (dd, J=6.6, 2.6 Hz, 1H), 4.06 (s, 5H), 3.80 (dd, J=11.1, 2.7 Hz, 1H), 3.72 (s, 1H), 3.59 (td, J=8.3, 2.6 Hz, 1H), 3.43 (dd, J=11.0, 8.4 Hz, 1H), 2.71 (d, J=17.7 Hz, 1H), 2.55 (d, J=17.7 Hz, 1H), 1.67 (br, 3H), 1.35 (d, J=6.6 Hz, 3H), 1.30 (s, 18H), 1.22 (s, 18H), 0.90 (s, 9H).

$^{13}$C NMR (151 MHz, CDCl$_3$) δ 174.44, 150.79 (d, J=6.7 Hz), 150.26 (d, J=7.2 Hz), 138.14 (d, J=7.9 Hz), 135.01 (d, J=7.5 Hz), 128.80 (d, J=20.9 Hz), 127.65 (d, J=20.7 Hz), 122.99, 122.73, 95.47 (d, J=21.7 Hz), 77.39 (d, J=6.8 Hz), 71.23 (d, J=3.8 Hz), 69.65, 69.08 (d, J=3.7 Hz), 68.58, 64.17, 60.61, 51.96 (d, J=8.9 Hz), 48.65, 34.88 (d, J=9.8 Hz), 33.22, 31.41 (d, J=14.6 Hz), 26.89, 19.03.

$^{31}$P NMR (243 MHz, CDCl$_3$) δ−23.86.

Example 13 Preparation of a Chiral Multidentate Ligand L9

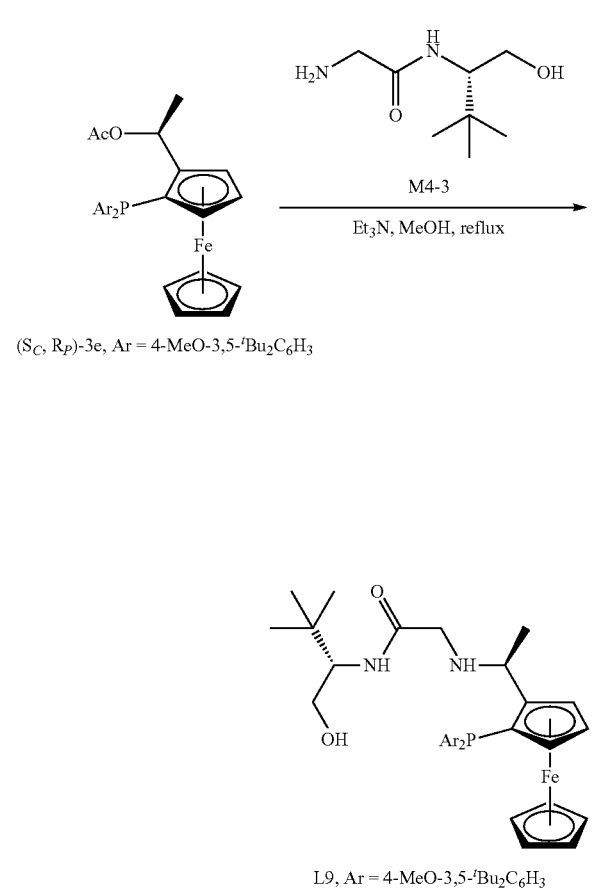

Example 14 Preparation of a Chiral Multidentate Ligand L10

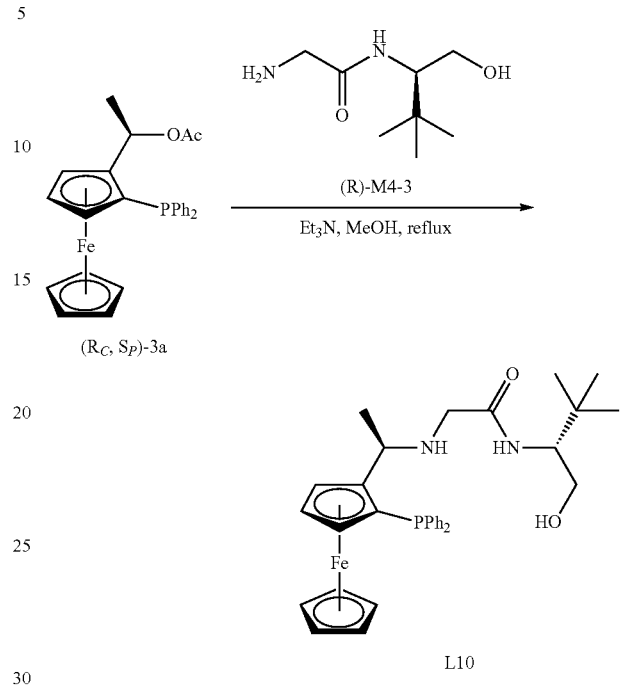

To a 50 mL reaction tube were added acetate 3 e (1.48 g, 2.0 mmol) and compound M4-3 (0.38 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L9 (0.77 g, 45% yield).

$^1$H NMR (600 MHz, CDCl$_3$) δ 7.77 (d, J=8.1 Hz, 1H), 7.39 (d, J=8.3 Hz, 2H), 7.22 (d, J=7.7 Hz, 2H), 4.37 (s, 1H), 4.28 (s, 1H), 4.14 (dd, J=6.6, 2.5 Hz, 1H), 4.05 (s, 5H), 3.81 (dd, J=11.1, 2.6 Hz, 1H), 3.71 (s, 3H), 3.69 (s, 1H), 3.60 (dd, J=8.1, 2.6 Hz, 1H), 3.58 (s, 3H), 3.44 (dd, J=11.0, 8.5 Hz, 1H), 2.76 (d, J=17.7 Hz, 1H), 2.57 (d, J=17.7 Hz, 1H), 1.67 (br, 3H), 1.40 (s, 18H), 1.35 (d, J=6.6 Hz, 3H), 1.31 (s, 18H), 0.91 (s, 9H).

$^{13}$C NMR (151 MHz, CDCl$_3$) δ 174.38, 160.51, 160.36, 143.76 (d, J=6.9 Hz), 143.19 (d, J=7.7 Hz), 132.97 (d, J=21.8 Hz), 132.63 (d, J=5.9 Hz), 131.77 (d, J=21.5 Hz), 129.57 (d, J=5.9 Hz), 95.40 (d, J=21.8 Hz), 77.76 (d, J=6.9 Hz), 71.07 (d, J=3.6 Hz), 69.59, 69.17 (d, J=3.7 Hz), 68.61, 64.36 (d, J=2.4 Hz), 64.15, 60.61, 51.91 (d, J=8.5 Hz), 48.56, 35.84 (d, J=3.3 Hz), 33.24, 32.04 (d, J=12.9 Hz), 26.89, 18.97.

$^{31}$P NMR (243 MHz, CDCl$_3$) δ−26.53.

To a 50 mL reaction tube were added acetate (R$_C$, S$_P$)-3a (0.91 g, 2.0 mmol) and compound (R)-M4-3 (0.38 g, 2.2 mmol) followed by nitrogen substitution. Then the reaction mixture was sequentially added with triethylamine (0.41 g, 4 mmol, 2 equiv) and anhydrous methanol (20 mL), followed by stirring at room temperature for 2 h, reflux overnight, evaporation, concentration, and column chromatography to obtain a pale yellow foamy solid as the chiral multidentate ligand L10 (0.58 g, 51% yield).

$^1$H NMR (400 MHz, CDCl$_3$) δ 7.53-7.48 (m, 3H), 7.28-7.22 (m, 3H), 7.22-7.12 (m, 4H), 4.44 (s, 1H), 4.32 (s, 1H), 4.23-4.19 (m, 1H), 4.02 (s, 5H), 3.84-3.73 (m, 2H), 3.63-3.59 (m, 1H), 3.43-3.38 (m, 1H), 2.84 (dd, J=17.5 Hz, 117.2 Hz, 2H), 1.39 (d, J=6.7 Hz, 3H), 0.90 (s, 9H);

$^{13}$C NMR (101 MHz, CDCl$_3$) δ 174.12, 139.72 (d, J=9.7 Hz), 136.77 (d, J=8.6 Hz), 134.83, 134.68, 132.58 (d, J=19.1 Hz), 129.24, 128.70, 128.54 (d, J=6.3 Hz), 128.20 (d, J=7.7 Hz), 96.29 (d, J=23.7 Hz), 75.21 (d, J=7.6 Hz), 71.59 (d, J=4.2 Hz), 69.73, 69.63, 69.59, 69.17, 63.80, 60.32, 51.48 (d, J=8.5 Hz), 48.03, 33.30, 26.96, 19.20;

$^{31}$P NMR (101 MHz, CDCl$_3$) δ−25.08.

Examples 15-24 Asymmetric Catalytic Hydrogenation of Simple Aromatic Ketones (S/C=10,000)

To a 4.0 mL reaction flask were added a catalyst precursor [Ir(COD)C1]$_2$(1.4 mg, 2.0×10$^{-3}$ mmol) and a ligand (L1-L10) (4.2×10$^{-3}$ mmol) in an argon-filled glove box. The mixture was added with dried $^i$PrOH (2 mL) for dissolving, and stirring at 25° C. for 2.0 h until the solution was changed from yellow to orange to obtain a metal complex solution. To a 5.0 mL hydrogenation flask were added anhydrous K$_2$CO$_3$ (10 µL, 0.02 mmol/mL) and freshly distilled acetophenone (0.2 mmol), followed by 1.0 mL of dried $^i$PrOH for dissolving. Then the metal complex solution (10 µL) was injected dropwise into the hydrogenation flask by using a micro syringe. The hydrogenation flask was carefully placed into an autoclave. The autoclave was tightened, removed from the glove box, and subjected to hydrogen substitution with 10 atm $H_2$ three times. After that, the autoclave was filled with 20 atm $H_2$, and the inlet valve of the autoclave was closed to allow the reaction mixture to undergo asymmetric catalytic hydrogenation under stirring at room temperature for 4 h. After the reaction was completed, the outlet valve of the autoclave was opened to slowly release $H_2$. The reaction mixture was subjected to rapid silica gel column chromatography with ethyl acetate as the rinsing agent to remove the metal complex, and evaporated to remove the solvent to obtain chiral alcohols. The chemical structures of the chiral alcohols were determined by 1H NMR and 13C NMR. The ee values of the chiral alcohols were determined by using chiral high performance liquid chromatography and chiral gas chromatography, and the spin values of the chiral alcohols were determined. The results were shown in Table 1.

TABLE 1

Screening of ligands for asymmetric catalytic hydrogenation of acetophenone

| Examples | Ligands | Solvents | Bases | conv. (%) | ee (%) |
|---|---|---|---|---|---|
| Example 15 | L1 | $^i$PrOH | $^t$BuOK | >99 | >99 |
| Example 16 | L2 | $^i$PrOH | $^t$BuOK | >99 | >99 |
| Example 17 | L3 | $^i$PrOH | $^t$BuOK | >99 | >99 |
| Example 18 | L4 | $^i$PrOH | $^t$BuOK | >99 | 97 |
| Example 19 | L5 | $^i$PrOH | $^t$BuOK | >99 | 96 |
| Example 20 | L6 | $^i$PrOH | $^t$BuOK | 85 | 95 |
| Example 21 | L7 | $^i$PrOH | $^t$BuOK | 80 | 93 |
| Example 22 | L8 | $^i$PrOH | $^t$BuOK | 69 | 94 |
| Example 23 | L9 | $^i$PrOH | $^t$BuOK | 65 | 91 |
| Example 24 | L10 | $^i$PrOH | $^t$BuOK | >99 | −99 |

Noted:
In Example 24, −99% ee indicates that the product catalyzed with L10 (ligand L10 is the enantiomeric equivalent of ligand L3 in Example 17) is of the opposite configuration to that obtained in Example 17.

Examples 25-38 Asymmetric Catalytic Hydrogenation of Aromatic Ketones

In Examples 25-38, compound L3 was used as the ligand, and the conditions of the asymmetric catalytic hydrogenation of aromatic ketones were optimized according to the above mentioned operation. Results were shown in Table 2.

TABLE 2

Optimization of conditions for asymmetric catalytic hydrogenation of acetophenone

| Examples | Ligands | Solvents | Bases | conv. (%) | ee (%) |
|---|---|---|---|---|---|
| Example 17 | L3 | $^i$PrOH | $^t$BuOK | >99 | >99 |
| Example 25 | L3 | MeOH | $^t$BuOK | 10 | 98 |
| Example 26 | L3 | EtOH | $^t$BuOK | 80 | 99 |
| Example 27 | L3 | EtOAc | $^t$BuOK | 20 | 98 |
| Example 28 | L3 | DCM | $^t$BuOK | 95 | 98 |
| Example 29 | L3 | THF | $^t$BuOK | 92 | 95 |
| Example 30 | L3 | Hexane | $^t$BuOK | 99 | >99 |
| Example 31 | L3 | Toluene | $^t$BuOK | 96 | >99 |
| Example 32 | L3 | $^i$PrOH | $K_2CO_3$ | >99 | >99 |
| Example 33 | L3 | $^i$PrOH | $Cs_2CO_3$ | >99 | >99 |
| Example 34 | L3 | $^i$PrOH | KOH | >99 | >99 |
| Example 35 | L3 | $^i$PrOH | NaOH | >99 | >99 |
| Example 36 | L3 | $^i$PrOH | NaOMe | 99 | >99 |

TABLE 2-continued

Optimization of conditions for asymmetric catalytic hydrogenation of acetophenone

| Examples | Ligands | Solvents | Bases | conv. (%) | ee (%) |
|---|---|---|---|---|---|
| Example 37 | L3 | $^i$PrOH | KOMe | >99 | >99 |
| Example 38 | L3 | $^i$PrOH | $^t$BuONa | >99 | >99 |

Example 39 Asymmetric Catalytic Hydrogenation of Aromatic Ketones

In Example 39, compound L3 was used as the ligand, sodium tert-butoxide was sued as the base, and isopropanol was used as the solvent. The reaction was schematically shown below, and the results were shown in Table 3.

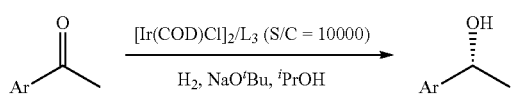

TABLE 3

Results of asymmetric catalytic hydrogenation of aromatic ketones

| Entry | Results |
|---|---|
| 1 | OH on phenyl; 99% yield; 98% ee |
| 2 | OH on 4-methylphenyl; 99% yield; 97% ee |
| 3 | OH on 4-methoxyphenyl; 99% yield; >99% ee |
| 4 | OH on 4-trifluoromethylphenyl; 98% yield; 98% ee |

TABLE 3-continued

Results of asymmetric catalytic hydrogenation of aromatic ketones

| Entry | Results |
|---|---|
| 5 | 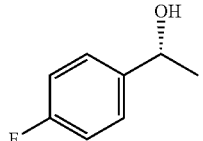<br>98% yield<br>98% ee |
| 6 | 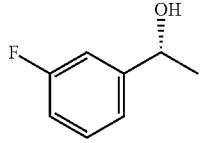<br>99% yield<br>>99% ee |
| 7 | 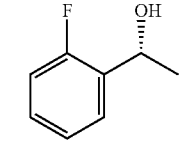<br>96% yield<br>>99% ee |
| 8 | 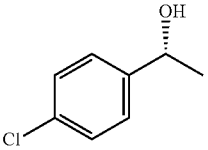<br>96% yield<br>>99% ee |
| 9 | 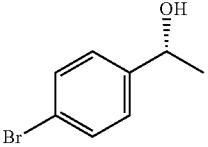<br>99% yield<br>>99% ee |
| 10 | 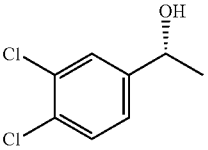<br>99% yield<br>>99% ee |
| 11 | 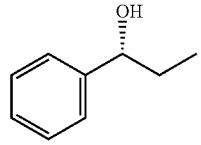<br>99% yield<br>>99% ee |
| 12 | 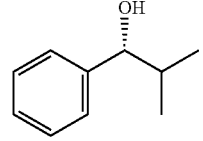<br>99% yield<br>99% ee |
| 13 | 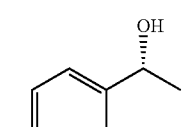<br>99% yield<br>99% ee |
| 14 | 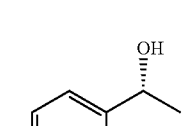<br>99% yield<br>99% ee |
| 15 | 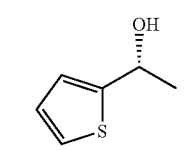<br>99% yield<br>99% ee |

Example 40 Asymmetric Catalytic Hydrogenation of α-Amino Ketones

In Example 40, the ligand L3 was applied to the asymmetric hydrogenation of α-amino ketones, and the results showed that the ligand L3 had good substrate generality and application. The reaction was schematically shown below, and the results were shown in Table 4.

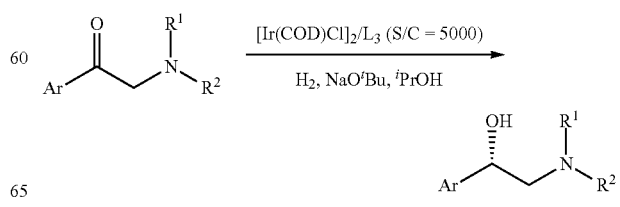

TABLE 4

Results of asymmetric catalytic hydrogenation of α-amino ketones

| Entry | Results |
|---|---|
| 1 | 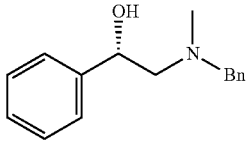 [SMILES: CN(Cc1ccccc1)C[C@@H](O)c1ccccc1]<br>99% yield<br>99% ee |
| 2 | 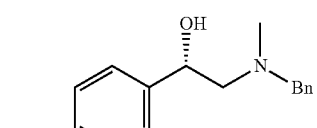<br>99% yield<br>>99% ee |
| 3 | 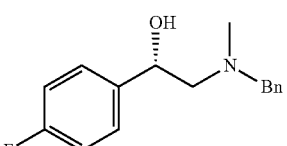<br>98% yield<br>99% ee |
| 4 | 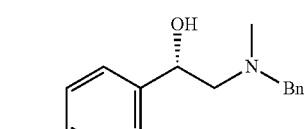<br>99% yield<br>>99% ee |
| 5 | 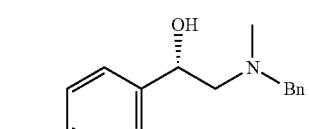<br>99% yield<br>>99% ee |
| 6 | 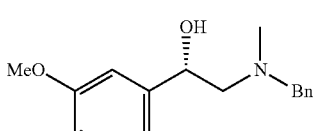<br>98% yield<br>>99% ee |
| 7 | 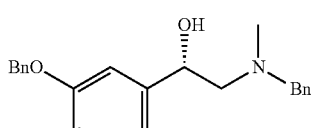<br>99% yield<br>>99% ee |

TABLE 4-continued

Results of asymmetric catalytic hydrogenation of α-amino ketones

| Entry | Results |
|---|---|
| 8 | 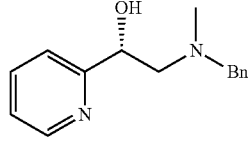 [SMILES: CN(Cc1ccccc1)C[C@@H](O)c1ccccn1]<br>99% yield<br>>99% ee |

Example 41 Asymmetric Catalytic Hydrogenation of α-Hydrochlorinated Ketones

In Example 40, the ligand L3 was applied to the asymmetric hydrogenation of α-hydrochlorinated ketones. After optimizing the conditions, potassium carbonate was taken as the base, and a mixture of toluene and isopropanol (v/v=10:1) was used as the solvent. The reaction was schematically shown below, and the results were shown in Table 5. The results indicated that the system had good universality in asymmetric α-hydrochlorinated ketones and was promising for industrial applications.

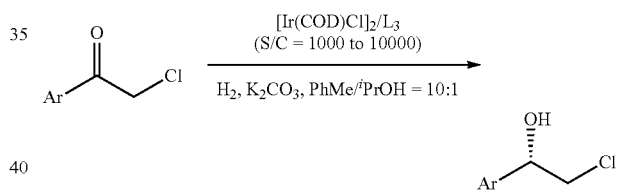

TABLE 5

Results of asymmetric catalytic hydrogenation of α-hydrochlorinated ketones

| Entry | Results |
|---|---|
| 1 | 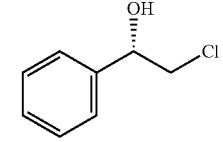<br>99% yield<br>98% ee |
| 2 | 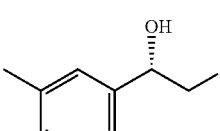<br>99% yield<br>97% ee |

TABLE 5-continued

Results of asymmetric catalytic hydrogenation of α-hydrochlorinated ketones

| Entry | Results |
|---|---|
| 3 | 4-MeO-C6H4-CH(OH)-CH2Cl<br>99% yield<br>>99% ee |
| 4 | 4-F3C-C6H4-CH(OH)-CH2Cl<br>98% yield<br>98% ee |
| 5 | 4-F-C6H4-CH(OH)-CH2Cl<br>99% yield<br>>99% ee |
| 6 | 2-F-C6H4-CH(OH)-CH2Cl<br>96% yield<br>>99% ee |
| 7 | 3-F-C6H4-CH(OH)-CH2Cl<br>96% yield<br>>99% ee |
| 8 | 4-Cl-C6H4-CH(OH)-CH2Cl<br>99% yield<br>>99% ee |
| 9 | 4-Br-C6H4-CH(OH)-CH2Cl<br>99% yield<br>>99% ee |
| 10 | 3,4-F2-C6H3-CH(OH)-CH2Cl<br>99% yield<br>99% ee |
| 11 | 3-pyridyl-CH(OH)-CH2Cl<br>99% yield<br>99% ee |
| 12 | 2-thienyl-CH(OH)-CH2Cl<br>99% yield<br>99% ee |

The above-mentioned embodiments are preferred embodiments of the present disclosure, and these embodiments are not intended to limit the present disclosure. Any other changes, modifications, substitutions, combinations, simplifications made without departing from the spirit and principle of the present disclosure shall be equivalent substitutions and are included in the scope of protection of the present disclosure.

What is claimed is:
1. A chiral multidentate ligand selected from the group consisting of L1-L10, shown as:

L1

-continued

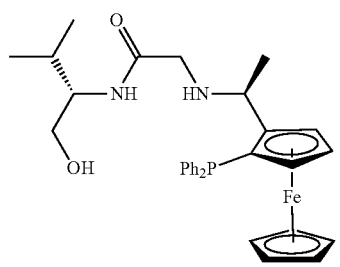
L2

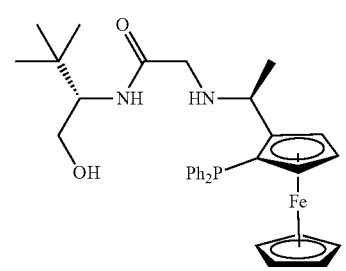
L3

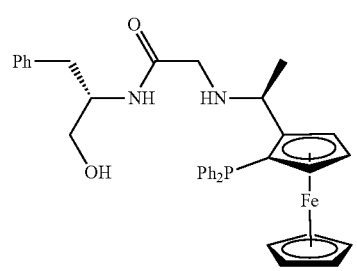
L4

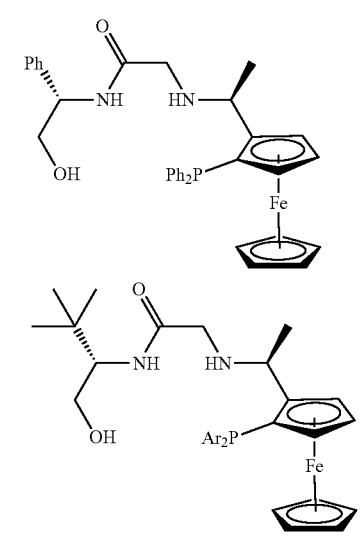
L5

L6: Ar = 4-MeC$_6$H$_4$
L7: Ar = 3,5-Me$_2$C$_6$H$_3$
L8: Ar = 3,5-$^t$Bu$_2$C$_6$H$_3$
L9: Ar = 4-MeO-3,5-$^t$Bu$_2$C$_6$H$_2$

-continued

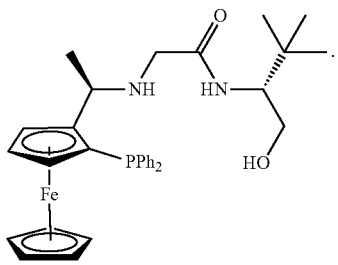
L10

2. A method of preparing the chiral multidentate ligand of claim 1, comprising:

(S1) subjecting compound (M1) containing an amino-protecting group and compound (M2) to undergo a condensation reaction to obtain compound (M3); and subjecting the compound (M3) to amine deprotection in the presence of a deprotection reagent to obtain compound (M4); wherein when the amino-protecting group is a t-butyloxy carbonyl (Boc) group, the deprotection reagent is selected from the group consisting of trifluoroacetic acid, methanesulfonic acid, hydrochloric acid, sulfuric acid, and phosphoric acid; and when the amino-protecting group is a benzyloxycarbonyl (Cbz) group, the amino-protecting group is removed under the catalysis of Pd/C catalysts or Pd(OH)$_2$/C catalyst in a hydrogen atmosphere;

(S2) subjecting compound (1) to deprotonation by butyl lithium and phosphorization to produce compound (2); and substituting a dimethylamino group in the compound (2) with an acetoxy group to obtain compound (3); and (S3) reacting the compound (3) with the compound (M4) in the presence of triethylamine to produce chiral multidentate ligands L1-L9, wherein an enantiomer L10 of a chiral multidentate ligand L3 is synthesized from corresponding chiral raw materials through a method of preparing the chiral multidentate ligand L3, as shown in the following reaction scheme:

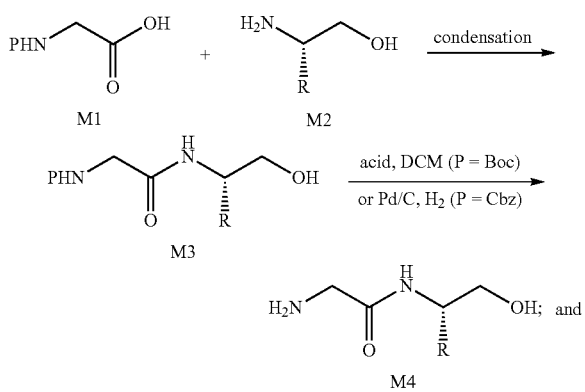

M4-1: R = Me
M4-2: R = $^i$Pr
M4-3: R = $^t$Bu;
M4-4: R = Bn
M4-5: R = Ph

33
-continued

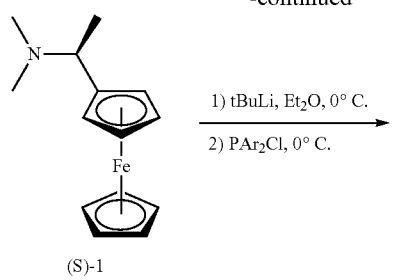

(S)-1

1) tBuLi, Et$_2$O, 0° C.
2) PAr$_2$Cl, 0° C.

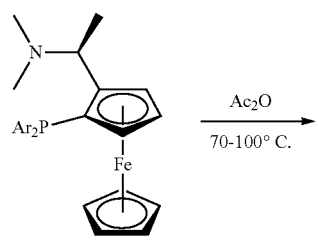

(S$_C$, R$_P$)-2
68-83% yield

Ac$_2$O
70-100° C.

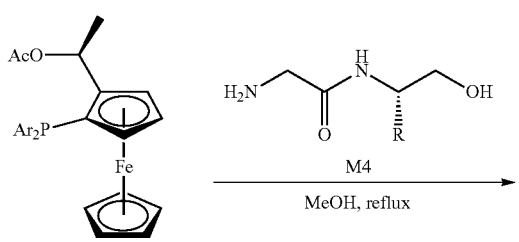

(S$_C$, R$_P$)-3
> 95% yield

M4
MeOH, reflux

34
-continued

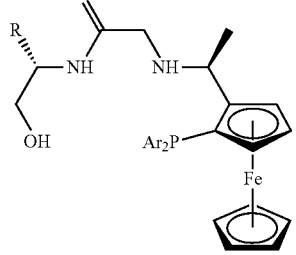

L1-L9

L1: Ar = Ph, R = Me
L2: Ar = Ph, R = $^i$Pr
L3: Ar = Ph, R = $^t$Bu
L4: Ar = Ph, R = Bn
L5: Ar = Ph, R = Ph
L6: Ar = Ar = 4-MeC$_6$H$_4$, Ph, R = $^t$Bu
L7: Ar = 3,5-Me$_2$C$_6$H$_3$, Ph, R = $^t$Bu
L8: Ar = 3,5-$^t$Bu$_2$C$_6$H$_3$, Ph, R = $^t$Bu
L9: Ar = 4-MeO-3,5-$^t$Bu$_2$C$_6$H$_2$, Ph, R = $^t$Bu

L10

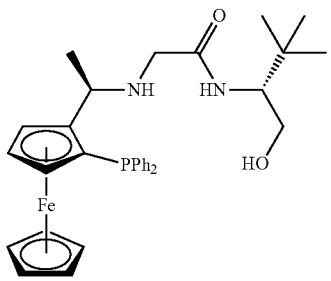

3. The method of claim 2, wherein the deprotection reagent is trifluoroacetic acid or hydrochloric acid.

* * * * *